(12) United States Patent
Minami et al.

(10) Patent No.: US 6,272,667 B1
(45) Date of Patent: Aug. 7, 2001

(54) METHOD AND APPARATUS FOR CLOCK GATED LOGIC CIRCUITS TO REDUCE ELECTRIC POWER CONSUMPTION

(75) Inventors: Fumihiro Minami; Takeshi Kitahara; Kimiyoshi Usami; Seiichi Nishio, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/168,961

(22) Filed: Oct. 9, 1998

(30) Foreign Application Priority Data

Oct. 9, 1997 (JP) .................................................. 9-277607
Nov. 19, 1997 (JP) .................................................. 9-318546

(51) Int. Cl.$^7$ .................................................. G06F 17/50
(52) U.S. Cl. .................................................. 716/6
(58) Field of Search .................................................. 716/6

(56) References Cited

U.S. PATENT DOCUMENTS 5,553,276 * 9/1996 Dean .................................................. 713/500
5,621,651 * 4/1997 Swoboda .................................................. 703/13

OTHER PUBLICATIONS

Gustavo et al., "Activity–Driven Clock Design for Low Power Circuits", IEEE Proceedings of ICCAD 95, (1995), pp. 62–65.

* cited by examiner

Primary Examiner—Matthew Smith
Assistant Examiner—Thuan Do
(74) Attorney, Agent, or Firm—Foley & Lardner

(57) ABSTRACT

A computer aided design technique for clock gated logic circuits effective to reduce the electric power consumption is disclosed. The computer aided design for clock gated logic circuits is conducted by extracting, by the use of information about a clock gated logic circuit under the design, a halt condition under which a clocked circuit driven by a clock signal can halt with no clock signal supplied, generating enable signal candidates, from said halt condition, which can be used as enable signals in the clock gated logic circuit, analyzing the clock gated logic circuit in order to obtain information about a delay time of signal transmission and electric power consumption reduction if respective one of enable signal candidates is used as an enable signal of a clock gating circuit inserted in the clock gated logic circuit under the design, storing enable signal candidate information including the result of the analysis conducted by said analysis step in a information store means, selecting an appropriate one of the enable signal candidates which satisfy given restrictions regarding a delay time of signal transmission in the clock gated logic circuit under the design, by the use of said enable signal candidate information; and adding the clock gating circuit activated with the enable signal as selected by said enable signal selection step to the clock gated logic circuit under the design.

10 Claims, 25 Drawing Sheets

| ENABLE SIGNAL CANDIDATES | (CLOCK GATING CIRCUIT) | | | | AREA INCREASE | POWER REDUCTION |
|---|---|---|---|---|---|---|
| | AREA | DELAY | POWER | NOT-LOAD PROBABILITY | | |
| a≠b | 1.5 | 2.8 | 2.0 | 0.65 | 10.5 | 30.5 |
| a≠c*d | 2.0 | 3.0 | 2.5 | 0.40 | 11.0 | 23.1 |
| a≠(b+c*d) | 3.5 | 4.5 | 3.6 | 0.70 | -83.5 | 53.5 |

FIG.17

FLIP-FLOP    : FF0    NON-LOAD CONDITION  ^d
FLIP-FLOP    : FF1    NON-LOAD CONDITION  ^d
             .
             .
             .
FLIP-FLOP    : FF31   NON-LOAD CONDITION  ^d

FIG.18

| ENABLE SIGNAL CANDIDATES | (CLOCK GATING CIRCUIT) | | | NOT-LOAD PROBABILITY | AREA INCREASE | POWER REDUCTION |
| --- | --- | --- | --- | --- | --- | --- |
| | AREA | DELAY | POWER | | | |
| a≠b | 1.5 | 2.8 | 2.0 | 0.65 | 10.5 | 30.5 |
| a*c*d | 2.0 | 3.0 | 2.5 | 0.40 | 11.0 | 23.1 |
| a≠(b+c*d) | 3.5 | 4.5 | 3.5 | 0.70 | -83.5 | 53.5 |
| a*b+^d | 3.2 | 3.5 | 2.8 | 0.75 | 12.2 | 38.7 |
| a*c+^d | 3.3 | 3.5 | 2.9 | 0.70 | 12.3 | 34.0 |
| ^d | 1.0 | 1.8 | 1.8 | 0.60 | 10.0 | 28.6 |
| a≠(b+c) | 3.0 | 4.1 | 3.0 | 0.75 | 12.0 | 38.5 |
| a≠(b+c)+^d | 4.0 | 4.7 | 3.5 | 0.80 | 13.0 | 48.0 |

METHOD AND APPARATUS FOR CLOCK GATED LOGIC CIRCUITS TO REDUCE ELECTRIC POWER CONSUMPTION

BACKGROUND OF THE INVENTION

1. Field of the Invention

The present invention is related to a gated clock design technique by the use of a computer, and more particularly related to a clock supplying circuit and an enable buffer cell, and a computer aided design system and method for clock gated logic circuits and design method thereof and an enable buffer cell.

2. Description of the Prior Art

In recent years, the integration and the chip size of LSIs have dramatically increased to require much power consumption. The gated clock design technique has been developed for the purpose of obtaining the logic circuit designs with low electric power consumption.

The procedure of modifying logic circuits by means of the gated clock design technique is called as "clock gating" in the following explanation. First, the gated clock design as mentioned above will be briefly explained.

FIG. 1 is a partial circuit diagram showing a clocked logic circuit which has not been clock gated. In the same figure, the reference symbols FF0,FF1, ... FF31 designate 32 D-type flip-flops in the form of a 32 bits data register in combination. The clock input port CK of the respective flip-flop is given the clock signal CLK at the same timing while the data input port D of the respective flip-flop is given data as calculated in the data processing circuit 11 in synchronism with the rising timing of the clock signal CLK.

It is known that the power consumption is increased when the clock signal supplied to the flip-flops rises up or falls down in the operation of the logic circuit of this kind. However, unnecessary power consumption occurs when there is no need for loading data to flip-flops, since the clock signal is continuously input to the flip-flops irrespective of existence of data to be loaded.

FIG. 2 is the circuit diagram of a logic circuit to which the clock gating technique is applied, in which an AND gate 12 is disposed as the gating circuit on the clock line as illustrated in FIG. 2. The AND gate 12 is connected to the enable logic circuit (not shown) for controlling output of the clock signal and for outputting the enable signal E of a logic one or a logic zero to the AND gate 12 in synchronism with the clock signal CLK.

In FIG. 2, when the enable signals E is set a logic one, data is input to the flip-flops in synchronism with the clock signal CLK because the logic product of the enable signals E and the signal CLK is a logic one. On the other hand, when the enable signals E is set a logic zero, data is not input to the flip-flops irrespective of the clock signal CLK taking a logic one because of the logic product of the enable signals E and the signal CLK always remains of a logic zero. Accordingly, when there is no need for loading data to flip-flops, unnecessary power consumption can be avoided by outputting the enable signals E of a logic zero in synchronism with the clock signal CLK.

The power saving efficiency is largely depending upon the actual technique of how to generate the enable signals based upon which storage elements such as registers and memories are selectively given the clock signal. Prior to the present invention, the design of the enable signals has been conducted by manual processes or by CAD systems for automatically generating the enable signals from the control algorithm of the logic circuit.

However, in accordance with the prior art clock gating circuit designing technique, any proposals for generating appropriate enable signals have not been made from the view point of the power saving efficiency. For this reason, it is not confirmed that the enable signals as used are appropriate for the power saving efficiency so that it, is often the case that the clock gating circuit designing technique has been conducted with inefficient enable signals.

On the other hand, while the frequency of the clock signal as supplied to the circuits integrated within an LSI chip has been drastically increased, the electric power consumption is also proportionally increased along therewith resulting in difficult problems associated. More specifically speaking, as a result of the increased electric power consumption, the heat as generated tends to exceed the capacity of heat dissipation of the package of an LSI chip. On the other hand, the life time of a battery system for supplying power to the LSI is often shortened by the resultant high temperature.

It is possible to assume that the sources of the power consumption of an LSI chip are located in a data transmission system, a clock system, an I/O system and function modules. Among them, the electric power consumption of the clock system is particularly large as compared to other systems. It is therefore effective for saving electric power consumption to decrease the electric power consumption in the clock system.

The clock gating technique has been well known as an effective technique for reducing the electric power The of a clock system. In accordance with this prior art technique, data transfer between registers is performed, only when it is necessary, by halting and resuming clock supply by means of a gated clock supplying circuit.

FIG. 3 is a circuit diagram showing a clock supplying circuit for the clock supplying a gated clock signal in accordance with the prior art technique. Enable buffer cells 72 are inserted between a root driver cell 71 and the register (flip-flop) 73 in order to form a tree structure. The respective enable buffer cells 72 are controlled by enable signals E1 to E3. Meanwhile, in this case, there is a branch through which the registers 73 are connected directly to the root driver cell 71.

In accordance with this gated clock circuit technique, the clock supplying circuit is implemented with the buffer cells 72 each of which outputs the logic product or sum of the clock signal CLK and the control signal E1, E2 or E3 called an enable signal are used. In the case as illustrated in FIG. 3, each enable buffer cell 72 outputs the logic product.

Accordingly, for example, only when the enable signals E1 is logic one, "1", the clock signal from the root driver cell 71 is passed to the register 73 at the end of sub-trees through the enable buffer cells 72. In the description, the clock signal as passed through the enable buffer cell is simply called as "the clock signal" while the clock signal as originally input to the root driver cell 71 is called as "the clock signal CLK".

FIG. 4 is a circuit diagram showing the operation of the enable buffer cell 72 for outputting the logic product of two input signals as described above. Each enable buffer cell 72 receives the enable signals EN through one input terminal thereof and the clock signal through the other input terminal and supplies its output signal to the registers 73. The clock signal is transferred through the buffer cells 72 only when the enable signals E1 is logic one "1", but not transferred through the buffer cells 72 when the enable signals E1 is logic zero "1". In the case that the enable buffer cell is designed for outputting the logic sum of two input signals, the clock signal is transferred through the buffer cell only when the enable signals E1 is logic zero "0", but not transferred through the buffer cell when the enable signals E1 is logic one "1".

As explained in the above, it is possible to dispense with unnecessary transmission of the clock signal by inserting the buffer cells of logic AND or OR receiving the enable signals and the clock signal together with a combinational circuit for generating the enable signals EN, and therefore to reduce the electric power consumption.

On the other hand, after generating appropriate enable signals, there might be further problems as follows. Namely, it is not yet confirmed whether or not the clock skew can be minimized in order to guarantee normal operation at a predetermined operating frequency while a number of different enable signals are used in the same clock system.

Conventionally, a sub-tree is formed with the buffer cells under control of the same enable signal in order to minimize the clock skew. In this case, however, a problem remains about how to minimize the differential delay time among the respective sub-trees. One of solutions will be explained with the circuit as illustrated in FIG. 3. Since the driving power of the circuit is not sufficient, buffer cells 74 are inserted in order to form a tree structure as illustrated in FIG. 5. In the case as illustrated in FIG. 5, the sub-tree through the enable buffer cell 72 under control of the enable signals E1 is the sub-tree Tm having the largest the delay time.

After determining the sub-tree Tm having the largest the delay time, the other sub-trees than the sub-tree Tm are provided with auxiliary buffer cells in order that the delay times thereof agree with that of the sub-tree Tm. For example, a number of transfer buffer cells are inserted after the buffer cells 74 under control of the enable signals E2 and E3 in a multi-stage fashion, or high power buffer cells 74a are inserted as in the lowest path in the illustration of FIG. 6. The insertion is made for the purpose of modifying the tree structure in order to minimize the clock skew by increasing the delay times In this case, the delay time may be increased also by decreasing the driving power of the buffer cells. In the case of the lowest path in the illustration, if three identical buffer cells are inserted, the delay time is too long. Two of the buffer cells 4a are therefore designed with higher driving power in order to decrease the delay time.

However, the driving power of a buffer cell can be adjusted only in steps, while the incremental number of stages as increased by insertion is also stepwise of course, so that it is difficult to finely adjust the delay time for the respective sub-tree. Accordingly, as the number of sub-trees of the respective enable signals increases as illustrated in FIG. 6, it is furthermore difficult to minimize the differential delay time among the respective sub-trees. The clock gating circuit designing technique implies complexity and prolonged development times as required.

SUMMARY OF THE INVENTION

The present invention has been made in order to solve the shortcomings as described above. It is an object of the present invention to provide a computer aided design system and a method for clock gated logic circuits effective to reduce the electric power consumption.

It is another object of the present invention to provide a clock supplying circuit and method for designing the same for clock gated logic circuits effective to minimize the clock skew.

It is a further object of the present invention to provide an enable buffer cell for outputting logic sum and an enable buffer cell for outputting logic product which have substantially same characteristics in terms of the signal delay.

In brief, the above and other objects and advantages of the present invention are provided by a new and improved computer aided design system for clock gated logic circuits comprising:

a circuit information storing section for storing information about a clock gated logic circuit under the design;

a halt condition extraction section for extracting, by the use of said information about the clock gated logic circuit, a halt condition under which a clocked circuit driven by a clock signal can halt with no clock signal supplied;

an enable signal candidate generation section for generating enable signal candidates, from said halt condition, which can be used as enable signals in the clock gated logic circuit;

an analysis section provided to analyze the clock gated logic circuit in order to obtain information about a delay time of signal transmission and electric power consumption reduction if respective one of enable signal candidates is used as an enable signal of a clock gating circuit inserted in the clock gated logic circuit under the design;

an enable signal candidate information storing section provided to store enable signal candidate information including the result of the analysis conducted by said analysis section;

a design restriction input section provided to input restrictions upon a delay time of signal transmission of the clock gated logic circuit under the design;

an enable signal selection section provided to select an appropriate one of the enable signal candidates which satisfy the restriction, by the use of said enable signal candidate information and said restriction information.

a clock gating circuit addition section provided to add a clock gating circuit activated with the enable signal as selected by said enable signal selection section to the clock gated logic circuit under the design.

Also, in accordance with a preferred embodiment of the present invention, said clocked circuit is a storage element to which data is loaded in synchronism with the clock signal while said halt condition extraction section is a non-load condition extraction section provided to extract the non-load condition under which it is not required to load data to said storage element.

Also, in accordance with a preferred embodiment of the present invention, said analysis section provided to analyze the clock gated logic circuit in order to obtain information also about an incremental area if respective one of enable signal candidates is used as an enable signal of the clock gating circuit in the clock gated logic circuit under the design.

Also, a preferred embodiment of the present invention is provided with a non-load condition input section provided to manually input non-load conditions under which it is not required to load data to said storage element.

Also, in accordance with a preferred embodiment of the present invention, the enable signal candidate information stored in said enable signal candidate information storing section is given in the form of a graph or a table on a CRT in order to make it possible to manually select an appropriate enable signal.

In accordance with a further aspect of the present invention, a computer aided design method for designing clock gated logic circuits comprising the steps of:

extracting, by the use of information about a clock gated logic circuit under the design, a halt condition under which a clocked circuit driven by a clock signal can halt with no clock signal supplied;

generating enable signal candidates, from said halt condition, which can be used as enable signals in the clock gated logic circuit;

analyzing the clock gated logic circuit in order to obtain information about a delay time of signal transmission and electric power consumption reduction if respective one of enable signal candidates is used as an enable signal of a clock gating circuit inserted in the clock gated logic circuit under the design;

storing enable signal candidate information including the result of the analysis conducted by said analysis step in a information store means;

selecting an appropriate one of the enable signal candidates which satisfy given restrictions regarding a delay time of signal transmission in the clock gated logic circuit under the design, by the use of said enable signal candidate information;

adding the clock gating circuit activated with the enable signal as selected by said enable signal selection step to the clock gated logic circuit under the design.

Also, in accordance with a preferred embodiment of the present invention, the clocked circuit is a storage element to which data is input in synchronism with the clock signal and said halt condition is a non-load condition.

Also, a preferred embodiment of the present invention is provided with a step of manually inputting a non-load condition under which it is not required to load data to said storage element.

Also, in accordance with a preferred embodiment of the present invention, the enable signal candidate information stored in said enable signal candidate information storing step is given in the form of a graph or a table on a CRT in order to make it possible to manually select an appropriate enable signal.

In accordance with a further aspect of the present invention, a computer program embodied on a computer-readable medium for designing clock gated logic circuits, said program comprising:

means for extracting, by the use of information about a clock gated logic circuit under the design, a halt condition under which a clocked circuit driven by a clock signal can halt with no clock signal supplied;

means for generating enable signal candidates, from said halt condition, which can be used as enable signals in the clock gated logic circuit;

means for analyzing the clock gated logic circuit in order to obtain information about a delay time of signal transmission and electric power consumption reduction if respective one of enable signal candidates is used as an enable signal of a clock gating circuit inserted in the clock gated logic circuit under the design;

means for storing enable signal candidate information including the result of the analysis conducted by said analysis step in a information store means;

means for selecting an appropriate one of the enable signal candidates which satisfy given restrictions regarding a delay time of signal transmission in the clock gated logic circuit under the design, by the use of said enable signal candidate information;

means for adding the clock gating circuit activated with the enable signal as selected by said enable signal selection step to the clock gated logic circuit under the design.

In accordance with a further aspect of the present invention, a clock supplying circuit comprising:

a root driver cell for receiving a clock signal; and a plurality of enable buffer cells each of which is provided with a first input terminal for receiving the clock signal, a second input terminal for receiving an enable signal, an output terminal for outputting the clock signal only when the enable signal as received by the second input terminal is active, said plurality of enable buffer cells being connected with each other in the form of a multi-stage buffering tree structure originating from said root driver cell;

a plurality of clocked circuits for receiving the clock signal from said root driver cell through said enable buffer cells;

wherein said enable buffer cells include a first enable buffer cell receiving a variable signal as the enable signal and a second enable buffer cell receiving a fixed signal as the enable signal which is constantly active.

Also, in accordance with a preferred embodiment of the present invention, the number of said enable buffer cells through which said clock signal is transferred from said the root driver cell to each of said clocked circuits is equal to the number of said enable buffer cells to another of said clocked circuits.

Also, in accordance with a preferred embodiment of the present invention, all of said the enable buffer cells have been designed in a substantially same configuration.

Also, in accordance with a preferred embodiment of the present invention, a fixed signal is given, as the enable signal, to those of said enable buffer cells that are located in the downstream side of one of said enable buffer cells to which the enable signal has been already given.

Also, in accordance with a preferred embodiment of the present invention, said root driver cell is directly connected to said one of said enable buffer cells to which the enable signal is given without any intervening one of said enable buffer cells.

Also, in accordance with a preferred embodiment of the present invention, said root driver cell is connected to said one of said enable buffer cells to which the enable signal is given only through one or more buffer of said second enable buffer cells.

Also, in accordance with a preferred embodiment of the present invention, there are at least one enable buffer cell driven by a first variable enable signal and at least one enable buffer cell driven by a second enable signal which is different from the first variable enable signal.

Also, in accordance with a preferred embodiment of the present invention, all of said the clocked circuits are provided with preceding enable buffer cells, said preceding enable buffer cells including at least one of said first enable buffer cells and at least one of said second enable buffer cells.

In accordance with a further aspect of the present invention, a method of designing a clock supplying circuit by the use of enable signals comprising the steps of:

locating enable buffer cells controlled by enable signals in order to form a multi-stage buffering tree structure and roughly determine clock signal paths.

checking whether or not the load capacitance of each of the respective enable signals is within the driving capability of a driver cell outputting said each of the respective enable signals and whether or not there is an unsatisfied timing constraint upon the enable signals;

resolving each unsatisfied timing constraint by inserting at least one buffer for reinforcing the enable signal or replacing the circuit design of said driver cell by a more powerful circuit design.

adjusting wirings of the clock signal paths in order to eliminate imbalance among delay times for respective clock signal paths in the multi-stage buffering tree structure; and determining the other signal paths including the enable signals.

Also, a preferred embodiment of the present invention is provided with the step of separating overlaid cells.

In accordance with a further aspect of the present invention, an enable buffer cell comprising:

a first inverter provided with an input terminal for receiving an input signal and an output terminal outputting an inverted signal of said input signal;

a transmission gate provided with an input terminal for receiving the inverted signal output from said first inverter, a pair of control terminals for receiving a control signal and an inverted signal of said control signal and an output terminal for outputting the output signal of said first inverter;

a second inverter provided with an input terminal for receiving the output signal of said transmission gate and an output terminal outputting an inverted signal of said output signal of said transmission gate; and a MOS transistor connected between the input terminal of said second inverter and a source of a fixed signal and receiving said enable signal through a gate terminal in order to give said fixed signal to said second inverter when said transmission gate is turned off.

Also, in accordance with a preferred embodiment of the present invention, said MOS transistor is a p-type MOS transistor whose drain terminal is connected to the input terminal of said second inverter, source terminal is connected to a power source, and gate terminal is given said enable signal.

Also, in accordance with a preferred embodiment of the present invention, said MOS transistor is an n-type MOS transistor whose source terminal is connected to the input terminal of said second inverter, drain terminal is connected to ground, and gate terminal is given said enable signal.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 17 is a table showing exemplary information of non-load conditions as input through the non-load condition input section 2 in accordance with a second embodiment of the present invention.

FIG. 18 is a table showing exemplary information stored in the enable signal candidate information storing section in accordance with the second embodiment of the present invention.

DETAILED DESCRIPTION OF EMBODIMENTS

Figure 7:
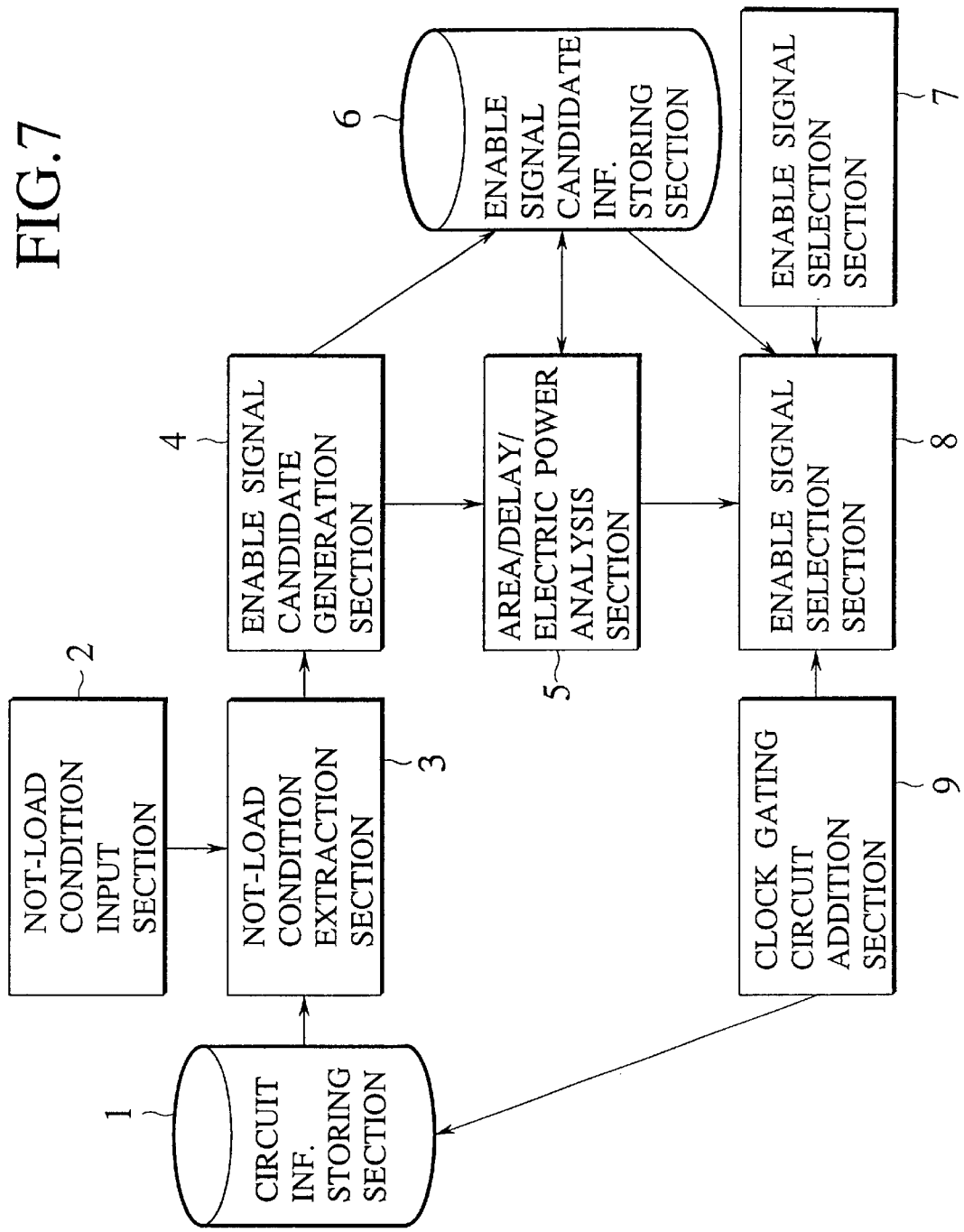
FIG. 7 is a function block diagram of a computer aided design system for clock gated logic circuits regarding a first embodiment of the present invention.

Referring now to the accompanying drawings, several embodiments of a clock supplying circuit and an enable buffer cell, and a computer aided design system and method for clock gated logic circuits, an enable buffer cell, and a computer program embodied on a computer-readable medium for designing clock gated logic circuits in accordance with the present invention will be explained in details. FIG. 7 is a function block diagram of a computer aided design system for clock gated logic circuits regarding a first embodiment of the present invention.

Figure 11:
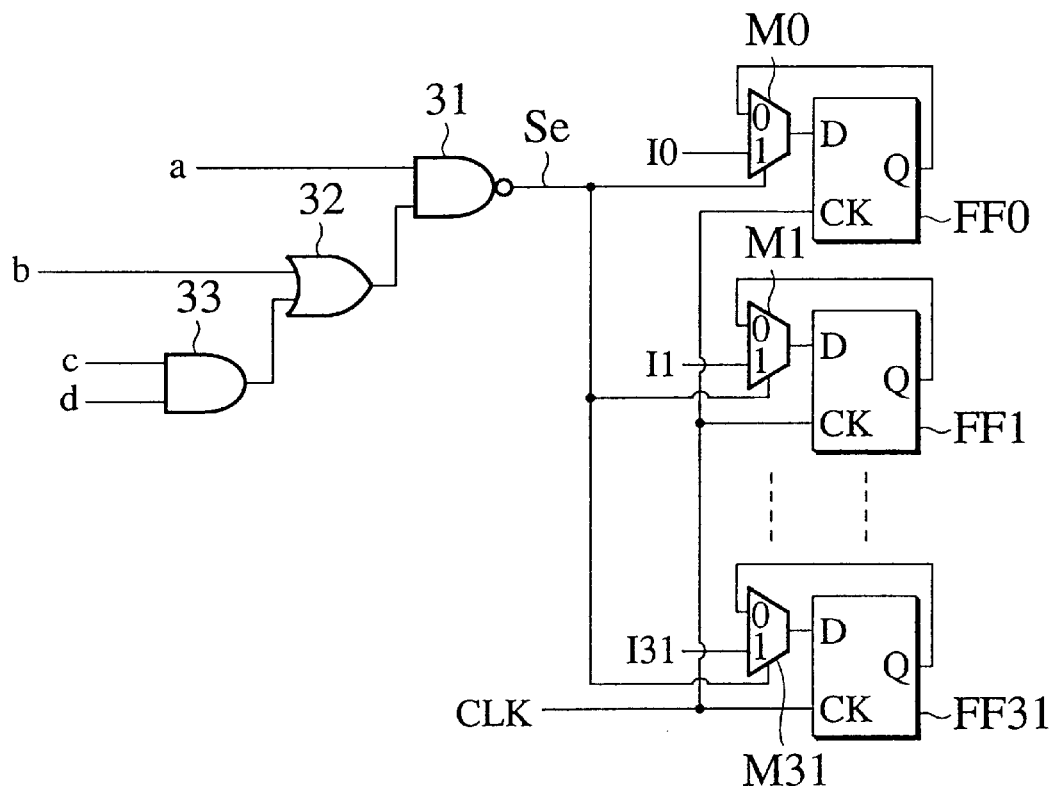
FIG. 11 is a circuit diagram showing part of the clock gated logic circuit under the design whose information is stored in the circuit information storing section 1.
Figure 12:
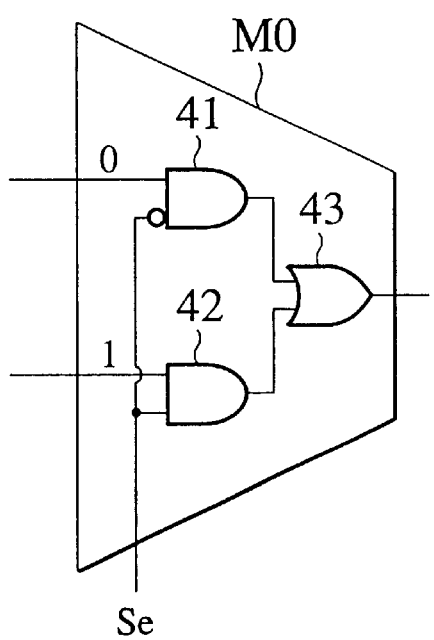
FIG. 12 is a circuit diagram showing the logic structure of the multiplexer as illustrated in FIG. 11.
Figure 15:
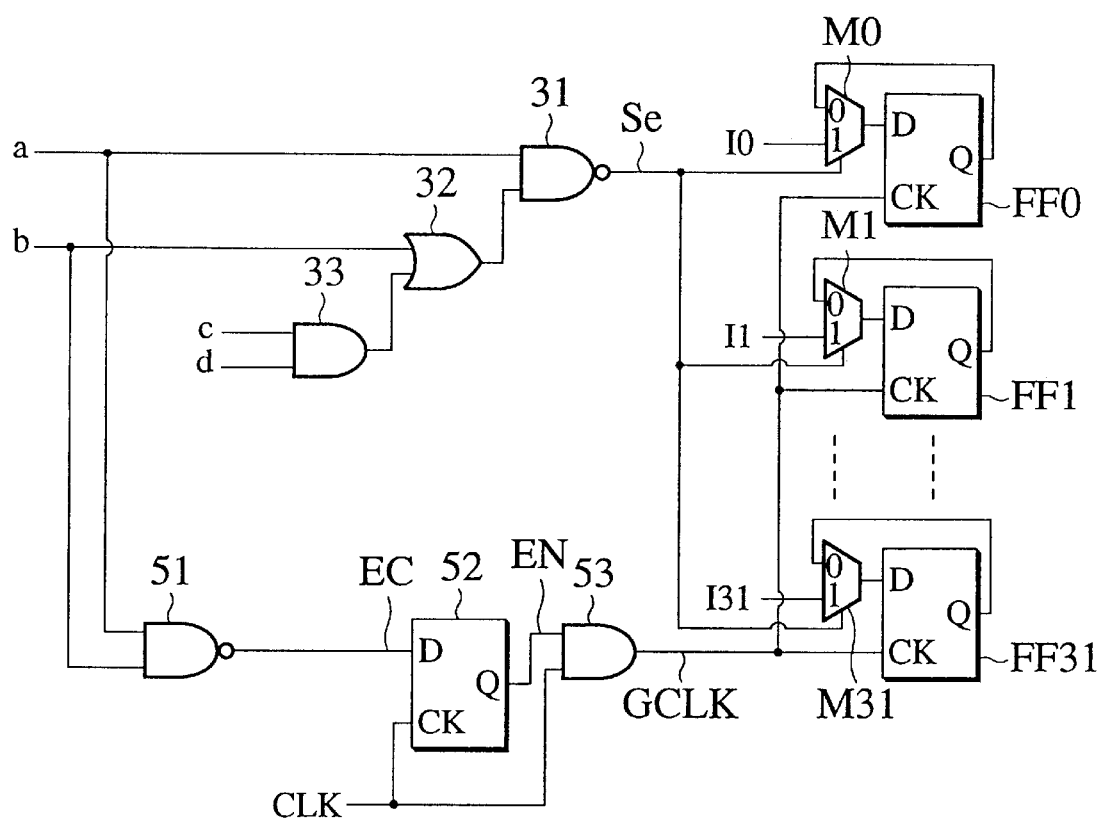
FIG. 15 is a circuit diagram showing an exemplary clock gated logic circuit under the design generated by the gated clock design technique in accordance with the first embodiment of the present invention.

For designing a clock gated layout on a logic circuit, this computer aided design system for clock gated logic circuits comprises a circuit information storing section 1, a non-load condition input section 2, a non-load condition extraction section 3, an enable signal candidate generation section 4 and, an area/delay/electric power analysis section 5, an enable signal candidate information storing section 6, design restriction input section 7, an enable signal selection section 8 and a clock gating circuit addition section 9. The circuit information storing section 1 is provided to store circuit information of the clock gated logic circuit under the design, e.g., the information as illustrated in FIGS. 11, 12 and 15 which are referred to in the following description. The non-load condition input section 2 is provided to manually input non-load conditions under which it is not required to load data to a storage element such as a flip-flop which is a constituent element of the logic circuit under the design. Generally speaking, the non-load condition input section 2 is a halt condition input section for inputting a halt condition under which a clocked circuit driven by the clock signal can halt with no clock supplied while the entirety of the system including the clocked circuit can continue normal operation.

The non-load condition extraction section 3 is provided to extract the non-load condition of said flip-flop on the basis of the circuit information of the logic circuit under designing as input through the non-load condition input section 2. Generally speaking, the non-load condition extraction section 3 is a halt condition extraction section for extracting a halt condition under which a clocked circuit driven by the clock signal can halt with no clock supplied while the entirety of the system including the clocked circuit can continue normal operation. The enable signal candidate generation section 4 is provided to generate enable signal candidates, from the non-load conditions, which can be used as enable signals in the gated clock design.

The area/delay/electric power analysis section 5 is provided to analyze the area, delay time and also electric power consumption required if the respective enable signal candidate is used as an enable signal of a clock gating circuit in the logic circuit under the design. The enable signal candidate information storing section 6 is provided to store the enable signal candidate information consisting of the enable signal candidates and parameter information including the result of the analysis conducted by the area/delay/electric power analysis section 5.

The design restriction input section 7 is provided to input restrictions regarding the area, delay time and also electric power consumption of the logic circuit under the design while the enable signal selection section 8 is provided to select appropriate enable signals among from the enable signal candidates which satisfy the restriction, by the use of said enable signal candidate information and said restriction information.

The clock gating circuit addition section 9 is provided to add the clock gating circuits activated with the enable signals as selected by the enable signal selection section 8 to the logic circuit under the design. The resultant logic circuit information is stored in the circuit information storing section 1.

Figure 8:
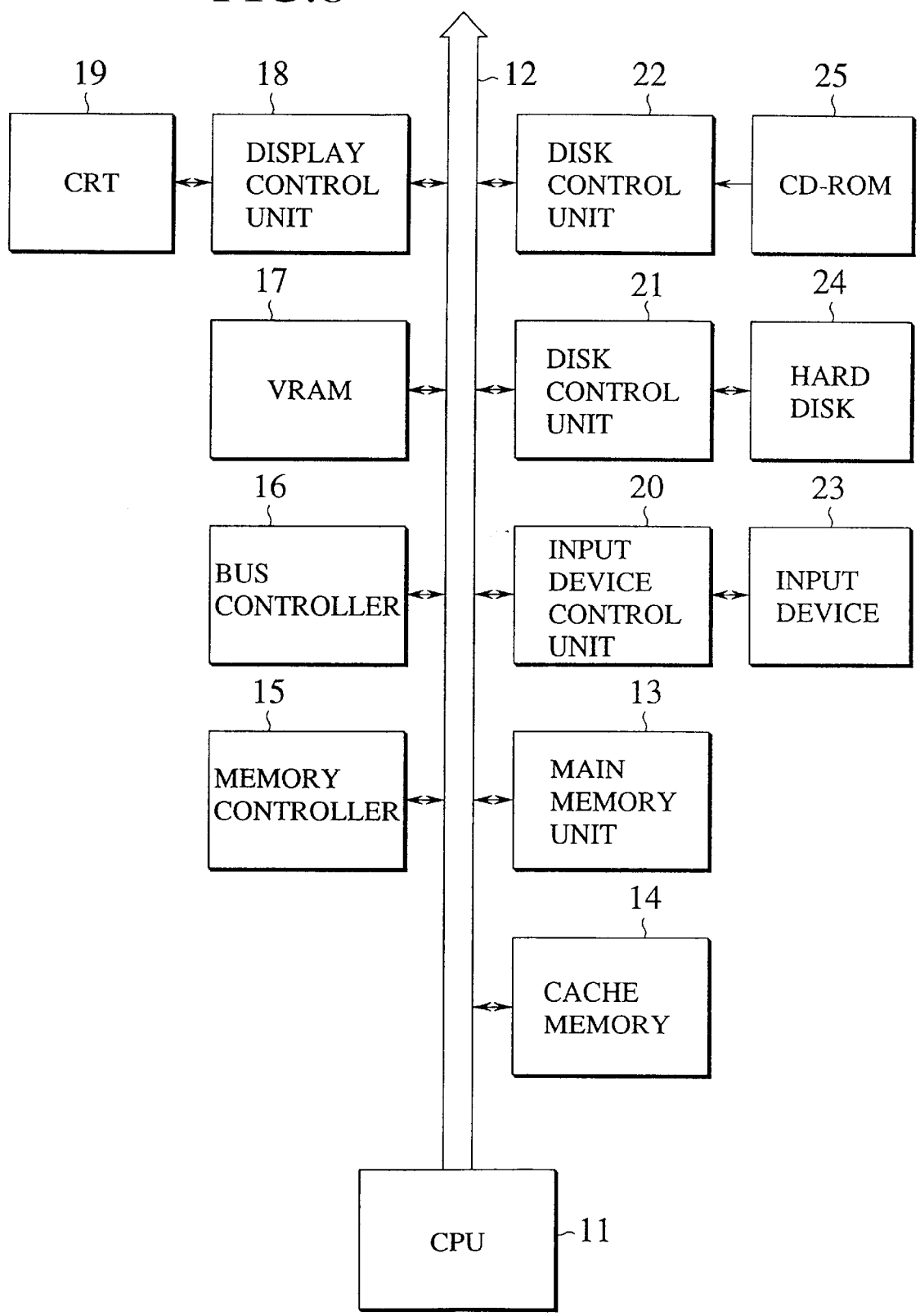
FIG. 8 is the block diagram showing the configuration of a computer for implementing the computer aided design system for clock gated logic circuits as illustrated in FIG. 7.

FIG. 8 is the block diagram showing the configuration of a computer for implementing the computer aided design system for clock gated logic circuits as illustrated in FIG. 7. In the figure, the numeral 11 designates a CPU for executing a computer aided design program for clock gated logic circuits in accordance with the present invention.

The CPU 11 is connected to a main memory unit 13, a cache memory 14, a memory controller 15, a bus controller 16, a VRAM 17, a display control unit 18, an input device control unit 20 and a disk control unit 21 and 22 through bus 12. The main memory unit 13 comprises a DRAM or an SRAM and functions as a memory for temporarily storing data such as the computer aided design program for clock gated logic circuits and computation result of the program and other necessary data. The cash memory 14 is the high speed memory that exists between the CPU 11 and the main memory unit 13 on the memory architecture and temporarily hold part of the data on the main memory unit 13 and substitute for the main memory unit 13.

The memory controller 15 is provided to control the data exchange between the main memory unit 13 or the cash memory 14 and the CPU 11. The bus controller 16 is provided to control the data exchange between the CPU 11 and the bus 12. The VRAM 17 is a video RAM for latching image data to be displayed in CRT 19.

The display control unit 18 is composed of a graphic processor for controlling the display operation in accordance with image data in the VRAM 17 on the CRT 19. The input device control unit 20 is provided to control input devices 23 of a keyboard and a mouse etc. while the disk control units 21 and 22 are provided to control external storage such as a hard disk 24, a CD-ROM 25 and so on.

The circuit information storing section 1 and the enable signal candidate information storing section 6 of the computer aided design system for clock gated logic circuits as illustrated in FIG. 7 are implemented as part of files in the hard disk 24. Furthermore, the non-load condition input section 2 and the design restriction input section 7 are provided with the input device 23. Also written in the CD-ROM 25 is the computer aided design program for clock gated logic circuits in accordance with the present invention. The respective functions of the non-load condition extraction section 3, the enable signal candidate generation section 4, the area/delay/electric power analysis section 5, the enable signal selection section 8 and the clock gating circuit addition section 9, as illustrated in FIG. 7, are enabled by loading and executing the computer aided design program for clock gated logic circuits in the CPU 11. Accordingly, in this case, the CD-ROM 25 constitutes an embodiment of the present invention as a possible record medium storing the computer aided design program for clock gated logic circuits of the present invention.

Figure 9:
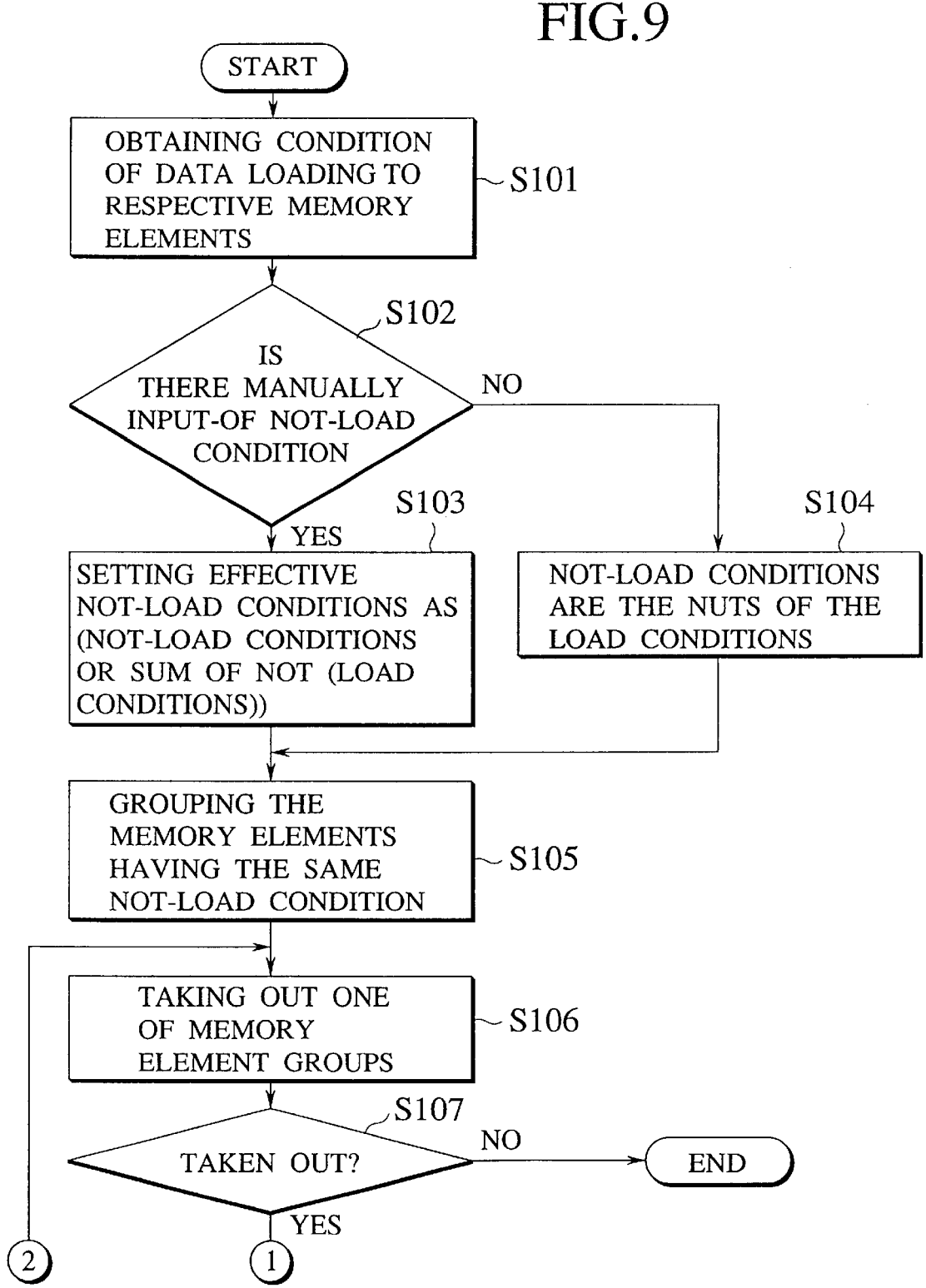
FIG. 9 is a flowchart shoring the operation of the computer aided design system for clock gated logic circuits followed by FIG. 10.
Figure 10:
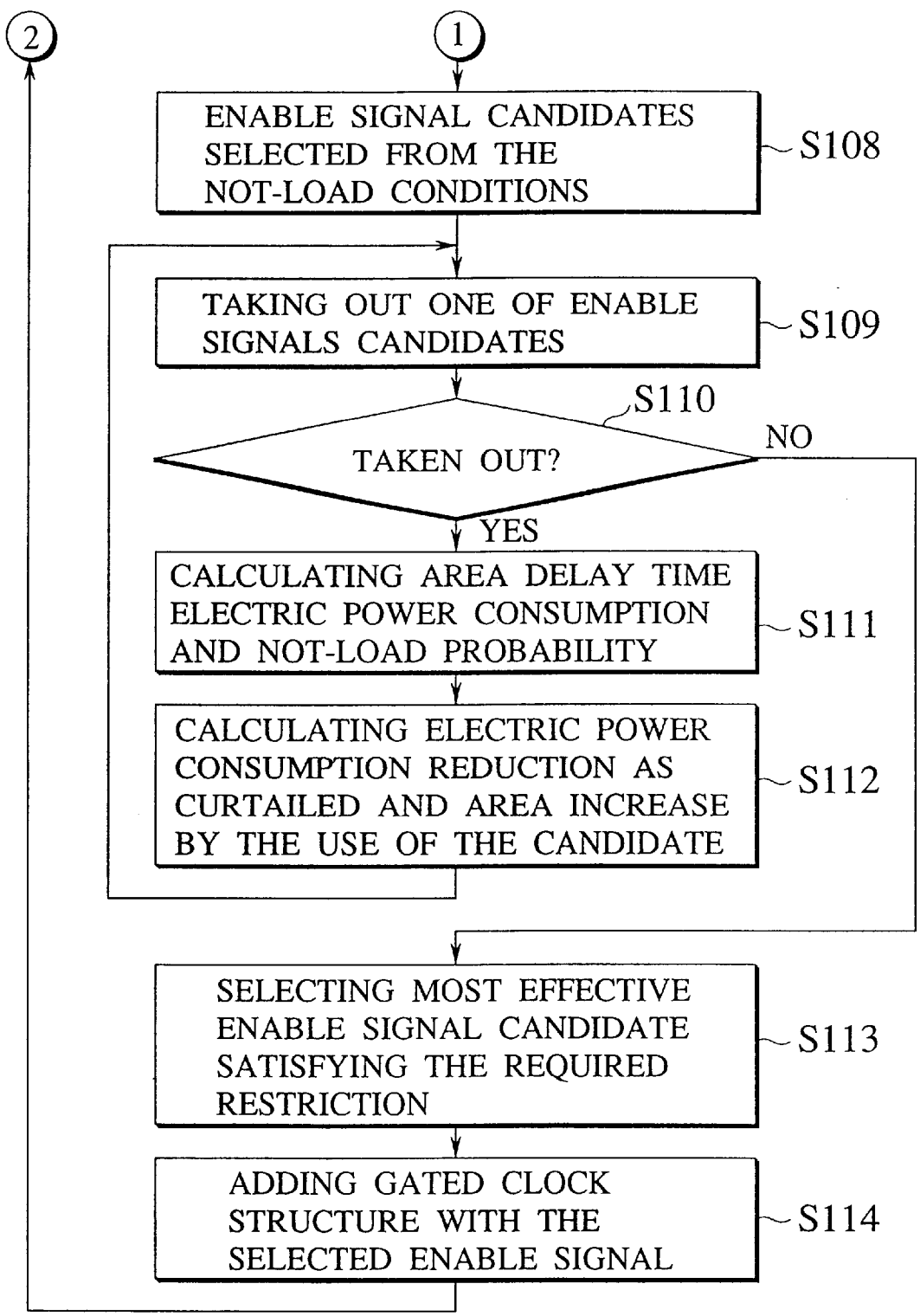
FIG. 10 is a flowchart shoring the operation of the computer aided design system for clock gated logic circuits following to FIG. 9.

Next, in reference to the flowchart as illustrated in FIG. 9 and FIG. 10, the operation of the computer aided design system for clock gated logic circuits of this embodiment will be explained.

First, the load condition under which data is loaded to respective one of memory elements such as flop-flops is obtained on the basis of the information in the circuit information storing section 1 by the non-load condition extraction section 3 in the step S101. Next, it is judged whether or not there is a non-load condition manually input from the non-load condition input section 2 in the step S102. In the case that there are non-load conditions as manually input through the non-load condition input section 2, effective non-load conditions are formed in the non-load condition extraction section 3 in the step S103 by taking logical sums of the manually inputted non-load conditions and the NOTs of the load conditions as obtained from the information in the circuit information storing section 1 by the non-load condition extraction section 3 in the step S101. In the case that there is no input of non-load condition information, the effective non-load conditions are the NOTs of the load conditions in the step S104.

Next, in the enable signal candidate generation section 4, those of the memory elements are grouped into a number of memory element groups in the step S105 in order that all the memory elements belonging to each group have an identical effective non-load condition. In the step S106 is taken out one of the memory element groups as obtained in the step S105. If it is not able to take out, the process is terminated in the step S107.

If it is able to take out, enable signal candidates are selected from the logic signals corresponding to the non-load conditions applicable to the memory elements belonging to that group in the step S108 of FIG. 10. The candidates of the enable signals as selected in the step S108 are stored in the enable signal candidate information storing section 6 and one of them is taken out in the step S108. If it is not able to take out in the step S110, the process is advanced to the step S107. If it is able to take out, the area, delay time, electric power consumption and non-load probability of the clock gating circuit associated with the respective candidate of the enable signals as taken out are calculated in the area/delay/electric power analysis section 5 and stored in the enable signal candidate information storing section 6.

Next, the electric power consumption reduction as curtailed and the area increase are calculated on the assumption that the candidate of the enable signals is used as an actual enable signal in the step S112. Returning to the step S109, a next candidate of the enable signal is taken out.

These steps S111 and S112 are repeated for all the candidate of the enable signals and all the necessary information as obtained is stored in the enable signal candidate information storing section 6. One enable signal candidate is then selected among from the enable signal candidates of the respective group in order that the selected enable signal candidate satisfies the required restriction regarding the delay time, area etc. as input from the design restriction input section 7 and most effective in regard to the electric power reduction.

Then, a clock gating circuit for implementing a gated clock structure is added by using the enable signal as selected in the step S114. Returning to the step S106, the next memory element group is taken out. When the above procedures of the step S114 through the step S108 are repeated for all the memory element groups, all the process ends.

Next, with reference to an actual example, the operation of each section will be explained in details.

It is assumed that the logic circuit under the design includes, in the circuit information storing section 1, a partial circuit as illustrated in FIG. 11. In the same figure, FF0, FF1, . . . , and FF31 designate flip-flops as memory elements. Each of the flip-flops has a data input terminal D, a clock input terminal CK and a data output terminal Q. The references M0, M1, . . . M31 designate multiplexers respectively and serve to output, the value at its input terminal (0) when the value of signal Se is "0" and to output the value at its input terminal (1) when the value of signal Se is "1". More specifically speaking, each of the multiplexer M0, M1 and M31 has the logic structure comprising two input AND gates 41 and 42 and two input OR gates 43, as shown in FIG. 12.

The signal Se input to each of the multiplexers M0, M1, . . . M31 is generated from the signals a, b, c and d by a 2-input NAND gate 31, a 2-input OR gate 32 and a 2-input AND gate 33, as shown in FIG. 11. First of all, the conditions for loading data to each flip-flop is obtained in the non-load condition extraction section 3 in the step S101, as follows. The logic at the data input terminal flip-flop FF0 is described by the following equation.

$$\hat{}(a*(b+c*d))*I0+(a*(b+c*d))*Out$$

Here, the binary operator "*" denotes the logical product of the right-hand value and the left-hand value; the binary operator "+" denotes the logical sum of the right-hand value and the left-hand value; the binary operator ^ denotes the logical negation of the right-hand value. The signal Out is the output Q of the flip-flop FF0. When the signal Out is selected, the data is maintained in the flip-flop. On the other hand, when the signal I0 is selected, the data is loaded into the flop-flop anew. From this fact, when the actual value of Out=0 and also I0=1 are input to the logic of the data input terminal D, the conditions for loading data is obtained as follows.

$$\hat{}(a*(b+c*d))$$

All the conditions for loading data to the other flip-flops FF1 to FF31 are obtained as follows by applying similar consideration.

$$\hat{}(a*(b+c*d))$$

Next, in the stop S102, it is judged whether or not non-load condition information is input through the non-load condition input section. In this case, it is assumed that there is no input. Because of this, in the step S104, the logical negation of ^(a*(b+c*d)), i.e., a*(b+c*d) is recognized as the non-load condition.

The storage elements having a common non-load condition are grouped in the step S105. Here, flip-flops FF0, FF1, . . . , FF31 have a common non-load condition, a*(b+c*d), and therefore belong to a same storage element group.

A possible number of such storage element groups are extracted in the step S106. The enable signal candidate generation section generates one or more enable signal candidates in the step S108 in order that when the signal value of the enable signal candidate is logic one, the non-load condition becomes true. In this case, since the non-load condition is a*(b+c*d), there are three enable signal candidates, i.e., a*b, a*c*d, a*(b+c*d). These three enable signal candidates are stored in the enable signal candidate information storing section 6.

One enable signal candidate is selected among these enable signal candidates in the step S109. In this case, it is assumed that the enable signal candidate a*b is extracted. The area, delay time, electric power consumption and non-load probability are calculated in the area/delay/electric power analysis section 5 with respect to the clock gating circuit which is necessary if the enable signal candidate a*b as illustrated in FIG. 13(a) is employed as an actually used enable signal in the step S111. The area thereof corresponds to that occupied by an AND gate while the delay time is the greater one of the time periods required for the signal "a" and the signal "b" to reach the output terminal through the AND gate. The non-load probability is the probability with the signal a*b being logic one "1" and calculated during analysis of the pertinent logic for the electric power consumption. One example of the analysis of electric power consumption of this kind is discussed in F.Najm, "Transition Density A Stochastic Measure of Activity in Digital Circuits" (Proceeding of 28th Design Automation Conference).

It is assumed that area 1.5, delay time 2.8, electric power consumption 2.0 and non-load probability 0.65 are calculated of the enable signal candidate a*b, in this embodiment. This result is stored in the enable signal candidate information storing section 6.

Next, the electric power consumption decrease and the area increase of the whole circuit as a result of the use the enable signal candidate a*b in step S112. With respect to the area increase, the area increase of extra flip-flops necessary for removing glitches of signals is taken into consideration in addition to the logic part that generates the enable signal candidate, as detailedly explained infra.

When the enable signal candidate agrees with the denial of the load condition is reduced, the multiplexers connected to the input terminals of the flip-flops can be dispensed with to further reduce power consumption. In this explanation, it is assumed that, as for the enable signal candidate a*b, the incremental area is 10.5 without agreeing with the negation of the load condition. On the other hand, the electric power consumption reduction is obtained by the electric power consumption analysis based on the signal probability as discussed above. The electric power consumption reduction is expected to be greater with a higher non-load probability of the enable signal candidate. The electric power consumption is assumed to be 30.5.

Figures 13, 14:
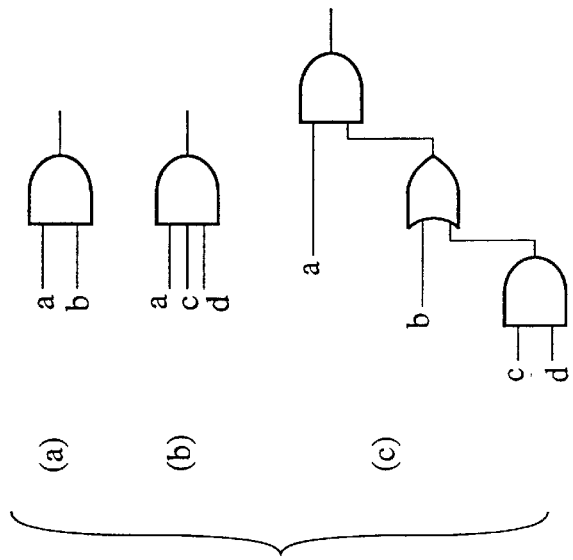
FIG. 13 is a circuit diagram showing examples of enable signal candidates.
FIG. 14 is a table showing exemplary information stored in the enable signal candidate information storing section in accordance with the first embodiment of the present invention.

The procedures of step S111 and also S112 are repeated with respect to the enable signal candidate a*c*d and a*(b+c*d). The information as illustrated in FIG. 14 is stored in the enable signal candidate information storing section 6 as a result of the steps S111 and S112 conducted with respect to the logic circuit for generating the enable signal candidate "a*c*d" and "a*(b+c*d)".

Next, in the step S113, the design restriction as input from the design restriction input section 7 is referred to. In this case, only the restriction on the delay time with respect to the enable signal is given 4.0. The enable signal candidate a*(b+c*d) does not satisfy the restriction because the delay time is 4.5. Because of this, one of the enable signal candidates a*b and a*c*d having a larger electric power consumption reduction is selected by the enable signal selection section 8. As a result, the signal a*b is selected as the enable signals by the enable signal selection section 8.

A clock gating circuit with the selected signal "a*b" as an enable signal is generated by the clock gating circuit addition section 9, and the circuit as illustrated in FIG. 15 is stored in the circuit information storing section 1 in the step S114. Namely, the circuit as illustrated in FIG. 11 is modified by adding the clock gating circuit having a 2-input NAND gate 51, a flip-flop 52 and an AND gate 53 as the circuit as illustrated in FIG. 15.

Figure 16:
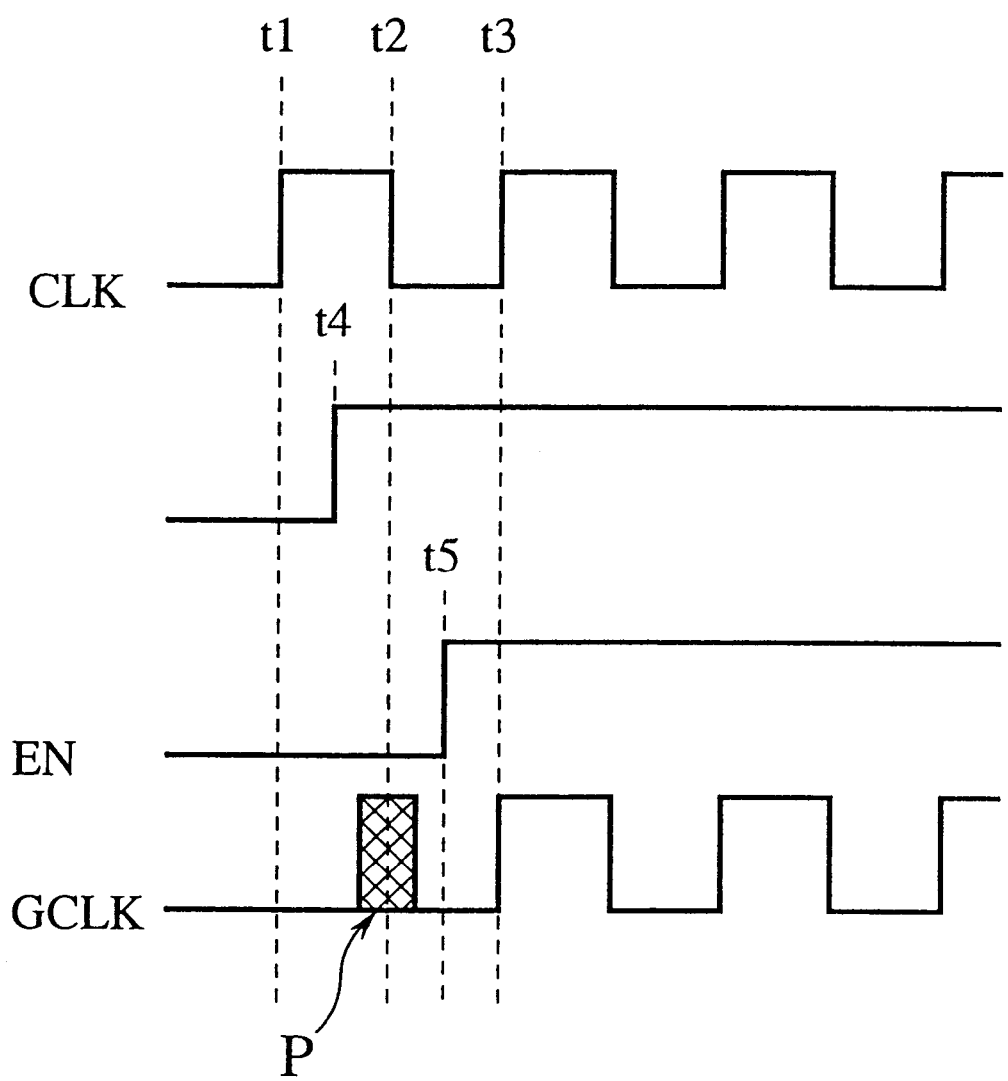
FIG. 16 is a timing chart showing occurrence of a glitch.

In this case, the flip-flop 52 constitutes the logic portion for the enable signal for removing the glitch of the signal as described above. The operation of the circuit without the flip-flop 52 will be explained with reference to FIG. 16 showing a timing chart. When the flip-flop 52 is not provided, one of the input terminals of the AND gate 53 directly receives the output signal EC of the NAND gate 51, i.e., the NAND signal of the signals a and b, while the clock signal CLK is input to the other input terminal of the AND gate 53. In this case, if the above described signal EC rises at time t4 in the high-level period (t1 to t2) of the clock signal CLK, the glitch P appears on the clock signal GCLK supplied to the clock input terminal CK of the flip-flop FF0 to FF31 the flip-flop in synchronism with the rising edge (t4) of the signal and the falling edge of the clock signal CLK.

In this embodiment of the present, invention, taking this point into consideration, the flip-flop 52 is inserted between the NAND gate 51 and the AND gate 53. Because the flip-flop 52 receives the signal EC in synchronism with the falling edge of the clock signal CLK, it is guaranteed that the output signal EN of the flip-flop 52 rises at time t5 in the low-level period (t2 to t3) of the clock signal CLK as an enable signal, even if the signal EC rises in the high-level period (t1 to t2). As a result, no glitch appears on the clock signal GCLK so that malfunction can be avoided.

Accordingly, in this embodiment of the present invention, the non-load conditions of the storage elements are extracted and the enable signal candidates for the gated clock design are generated on the basis of the non-load conditions. The enable signals are selected taking into consideration parameters such as the area, delay time, electric power consumption and so forth of the enable signal candidates respectively. It is therefore possible to design effective gated clock layouts making use of optimal enable signals for maximum reduction of the electric power consumption.

FIG. 17 is a table showing exemplary information of non-load conditions as input through the non-load condition input section 2 in accordance with a second embodiment of the present invention.

Figure 1:
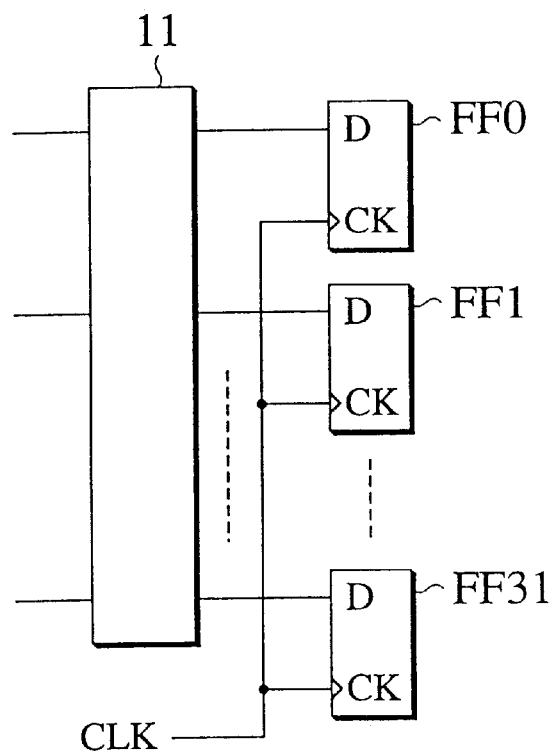
FIG. 1 is a partial circuit diagram showing a clocked logic circuit which has not been clock gated in accordance with the prior art technique.
Figure 2:
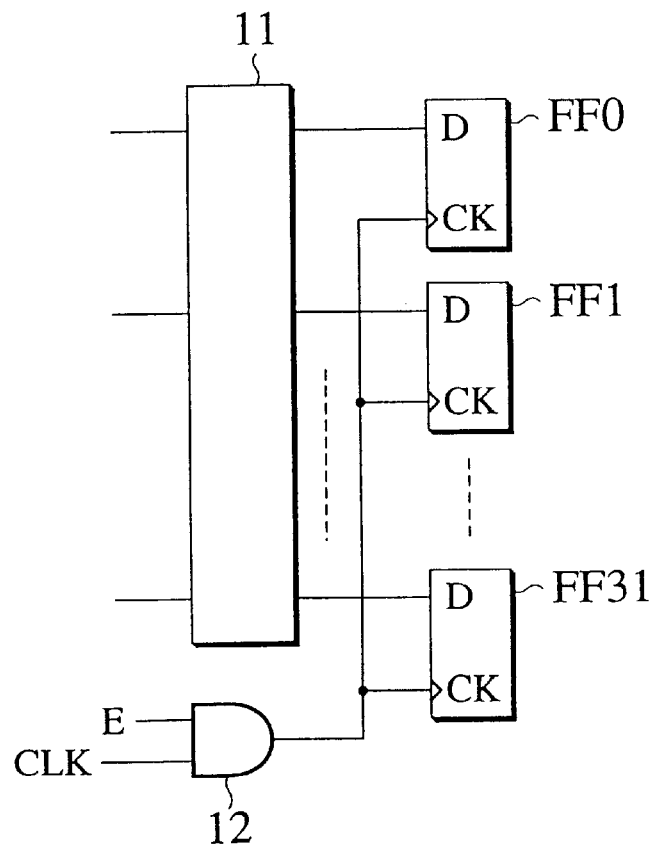
FIG. 2 is a partial circuit diagram showing a clocked logic circuit which has not been clock gated in accordance with the prior art technique.
Figure 3:
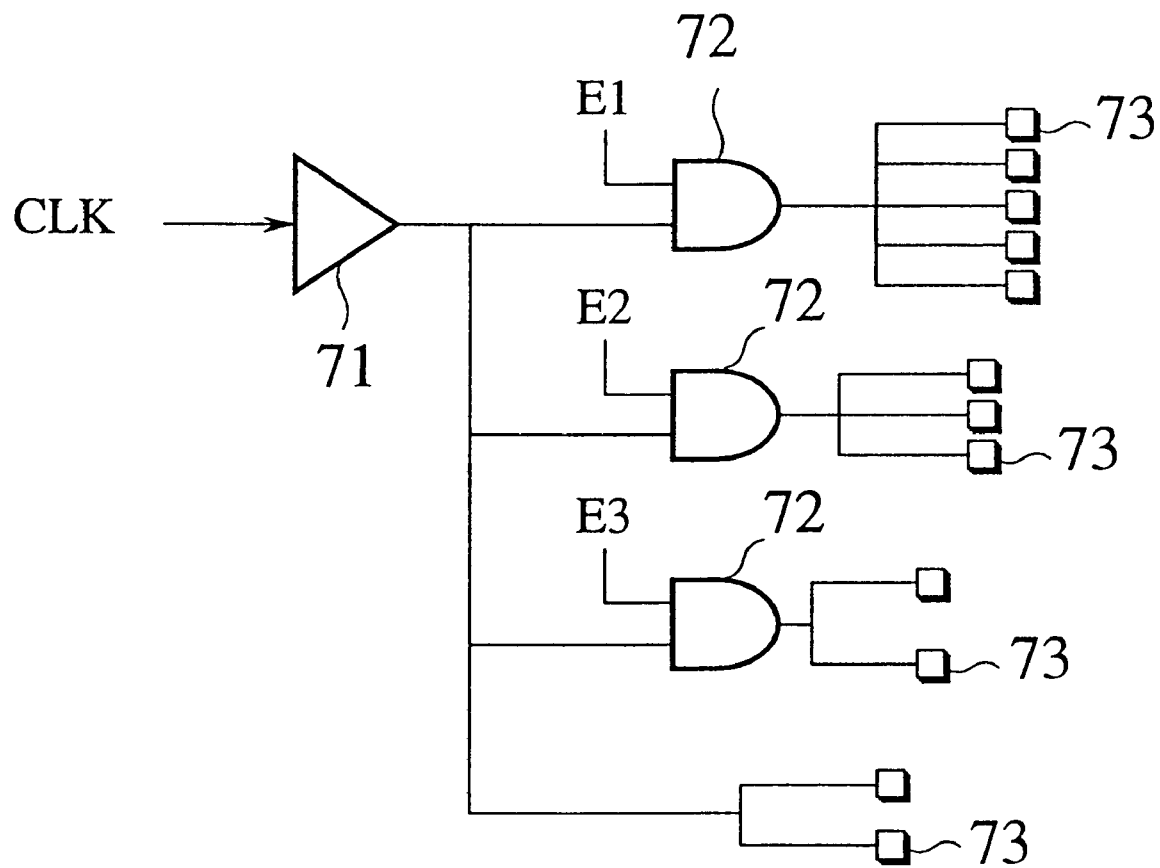
FIG. 3 is a circuit diagram showing a clock supplying circuit for the clock supplying a gated clock signal in accordance with the prior art technique.
Figure 4:
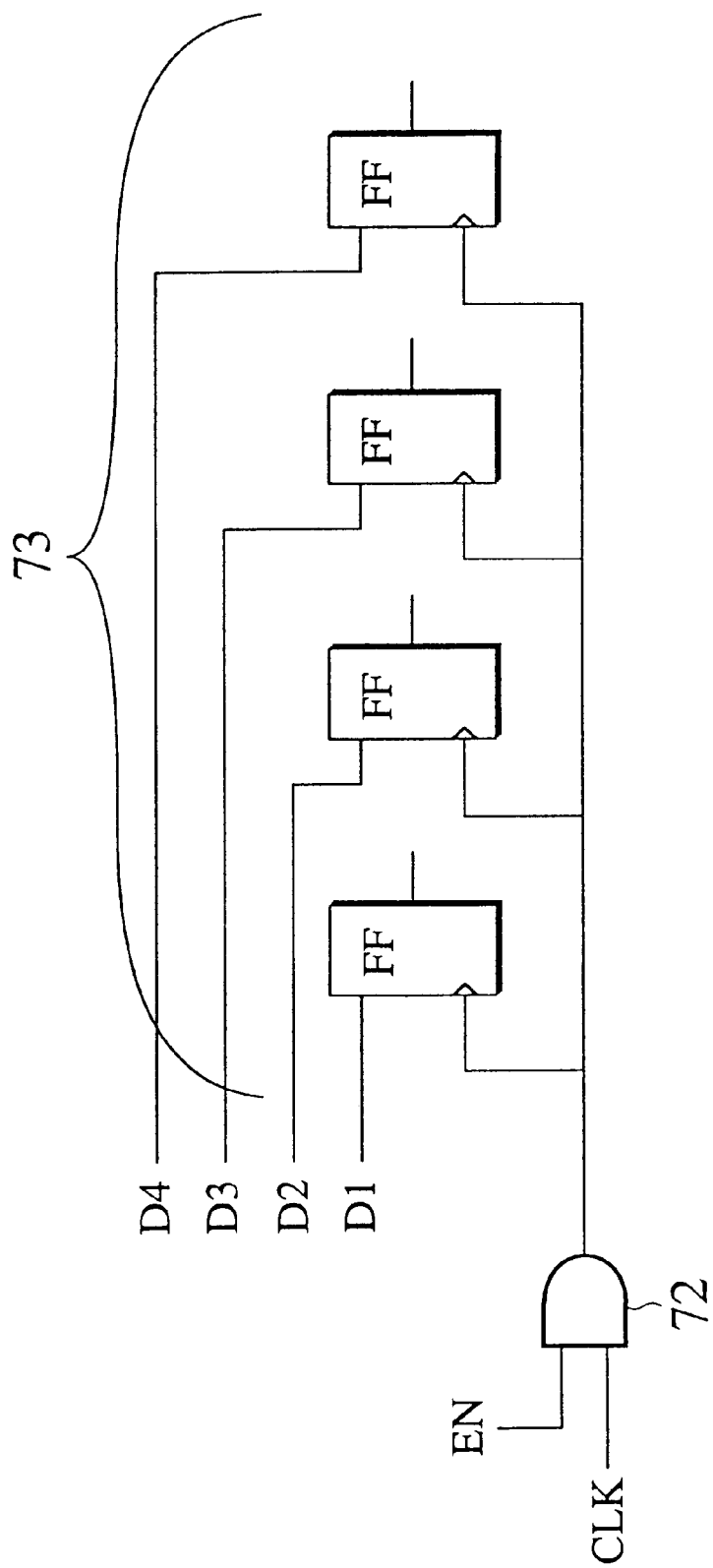
FIG. 4 is a circuit diagram showing the operation of the enable buffer cell 2 for outputting the logic product of two input signals as illustrated in FIG. 3.
Figure 5:
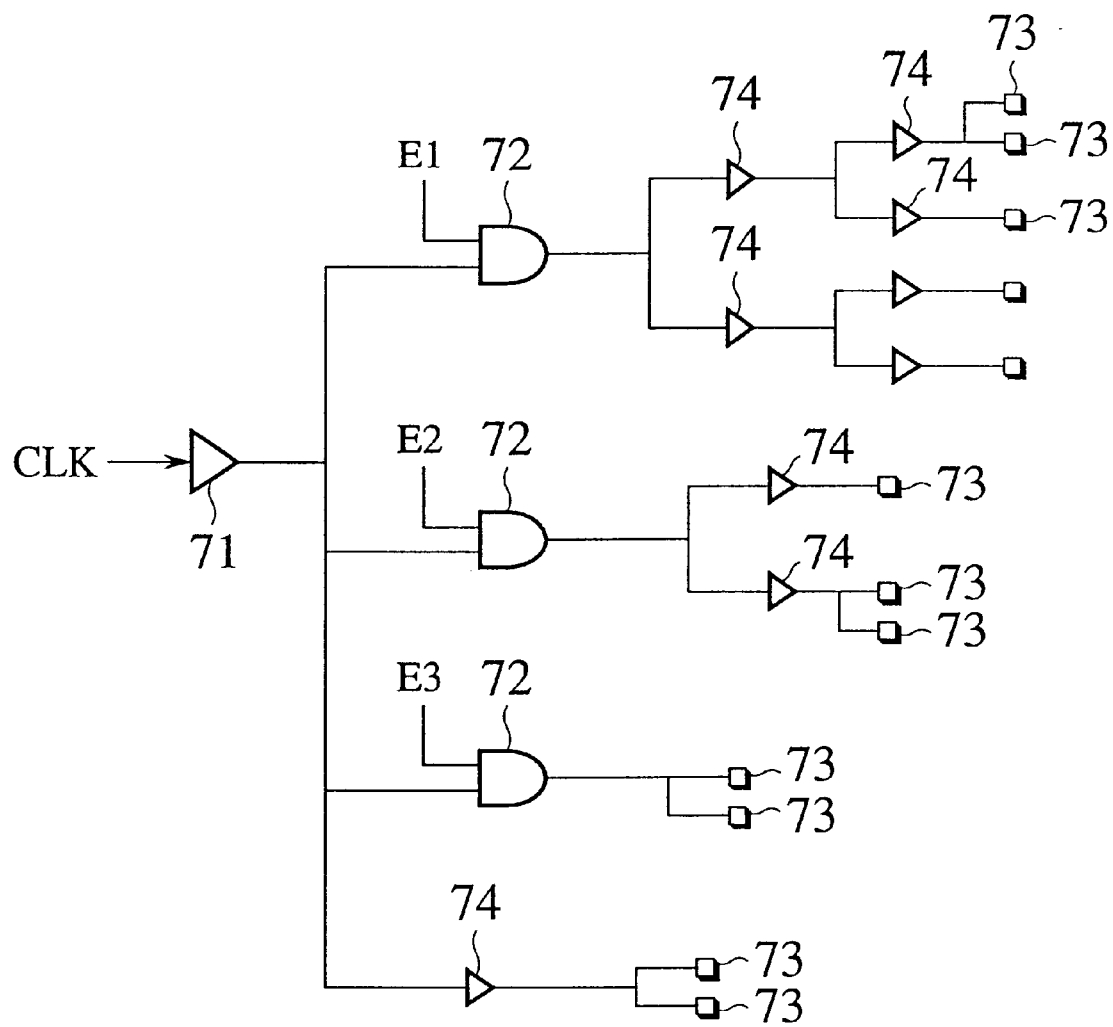
FIG. 5 is a circuit diagram showing a modification of the clock supplying circuit as illustrated in FIG. 3 in which buffer cells are inserted in order to form a tree structure with minimum delay times.
Figure 6:
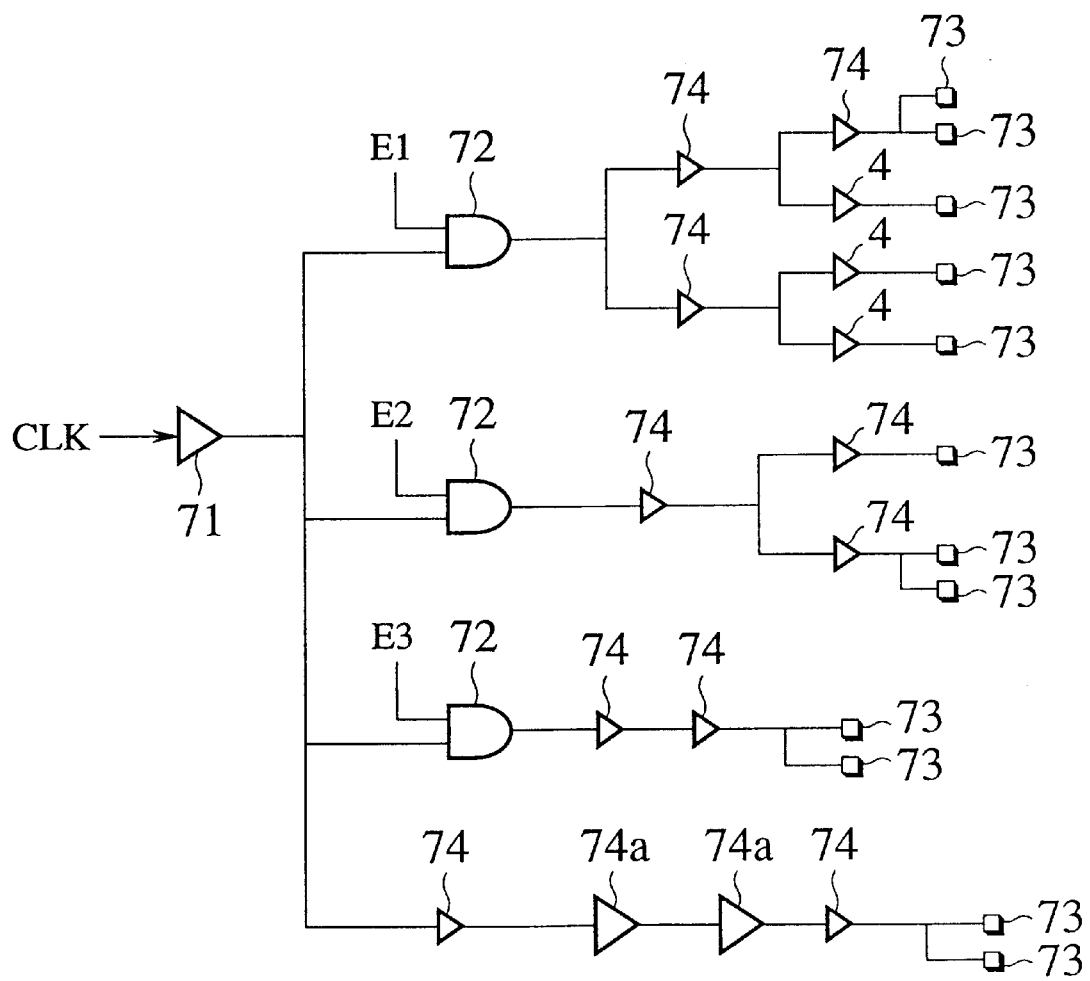
FIG. 6 is a circuit diagram showing a modification of the clock supplying circuit as illustrated in FIG. 5 in which buffer cells are arranged in order to minimize the clock skew by increasing the delay times.

Explained in this embodiment of the present invention is the case that the non-load conditions as illustrated in FIG. 17 are input through the non-load condition input section 2 in the same configuration as illustrated in FIG. 7 to FIG. 10. In accordance with this embodiment of the present invention in which non-load conditions are additionally input through the non-load condition input section 2, it is possible to take into consideration the non-load conditions which can not be extracted by the non-load condition extraction section 3 and the "don't care" conditions directly extracted from the logic circuit, so that more appropriate enable signals can be generated as compared to the first embodiment. Meanwhile, information stored in the circuit information storing section 1 is similar to that as illustrated in FIGS. 11 and 6.

In the step S101, the conditions for loading data to the flip-flops FF1 to FF31 are determined as ^(a*(b+c*d)) in the same manner as the above described first embodiment. In this case, because of the non-load conditions input through the non-load condition input section 2, the non-load condition of the flip-flops FF1 to FF31 is determined as a*(b+c)+^d, which is the sum of the non-load condition as input and the logical negation of the load condition a*(b+c*d) in the step S103.

The flip-flops FF1 to FF31 are grouped in the step S105. With respect to this group, the enable signal candidates are generated from the non-load condition a*(b+c)+^d in the step S108. In this case, a*b, a*c, ^d, a*(b+c), a*b+^d, a*c+^d, a*(b+c*d) and a*(b+c)+^d are generated as the enable signal candidates.

The steps 111 and 112 are conducted for the respective enable signal candidates in order to store the enable signal candidate information of the respective enable signal candidates in the enable signal candidate information storing section 6 as illustrated in FIG. 18. It is assumed here that the design restriction input from the design restriction input section 7 is given as restriction on the delay time of 4.0 with respect to the logic portion for the enable signal in the same manner as the first embodiment.

In the step S113, one the enable signal candidate a*b+^d is selected which has the largest electric power consumption reduction among from the enable signal candidates as stored in the enable signal candidate information storing section 6 satisfying the restriction on the delay time.

Figure 19:
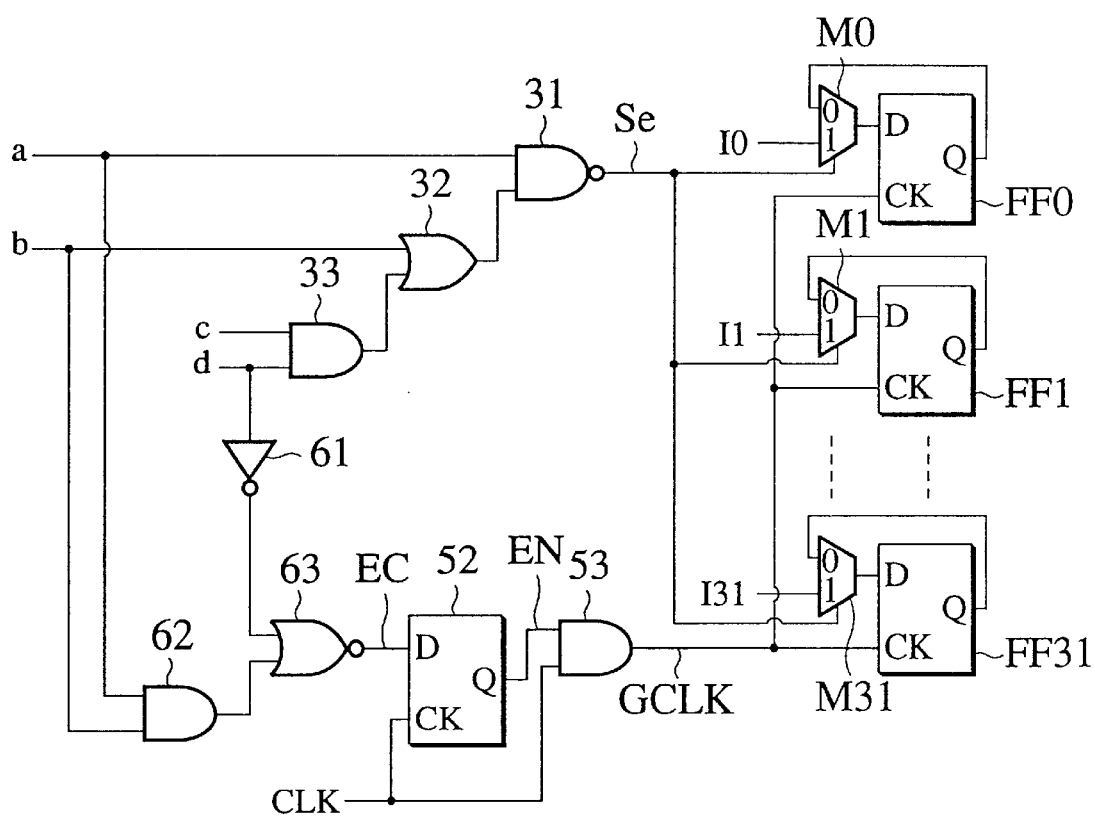
FIG. 19 is a circuit diagram showing an exemplary clock gated logic circuit under the design generated by the gated clock design technique in accordance with the second embodiment of the present invention.

The clock gating circuit with the selected signal "a*b+^d" as an enable signal is generated by the clock gating circuit addition section 9, and the circuit as illustrated in FIG. 19 is stored in the circuit information storing section 1 in the step S114. Namely, the NAND gate 51 as illustrated in FIG. 19 is replaced by the 2-input AND gate 62 and the 2-input NOR gate 63 one terminal of which is connected to the output terminal of the inverter 61 serving to invert the signal "d" as illustrated in FIG. 19.

Hereinbelow, a third embodiment will be explained. Explained in this embodiment of the present invention is the case that, when an enable signal is selected among from the enable signal candidates by the enable signal selection section 8, a user of the system is provided with the enable signal candidate information in the form of a graph or a table on the CRT in order to enable him to select appropriate enable signals in the same configuration as illustrated in FIG. 7 to FIG. 10.

Figure 20:
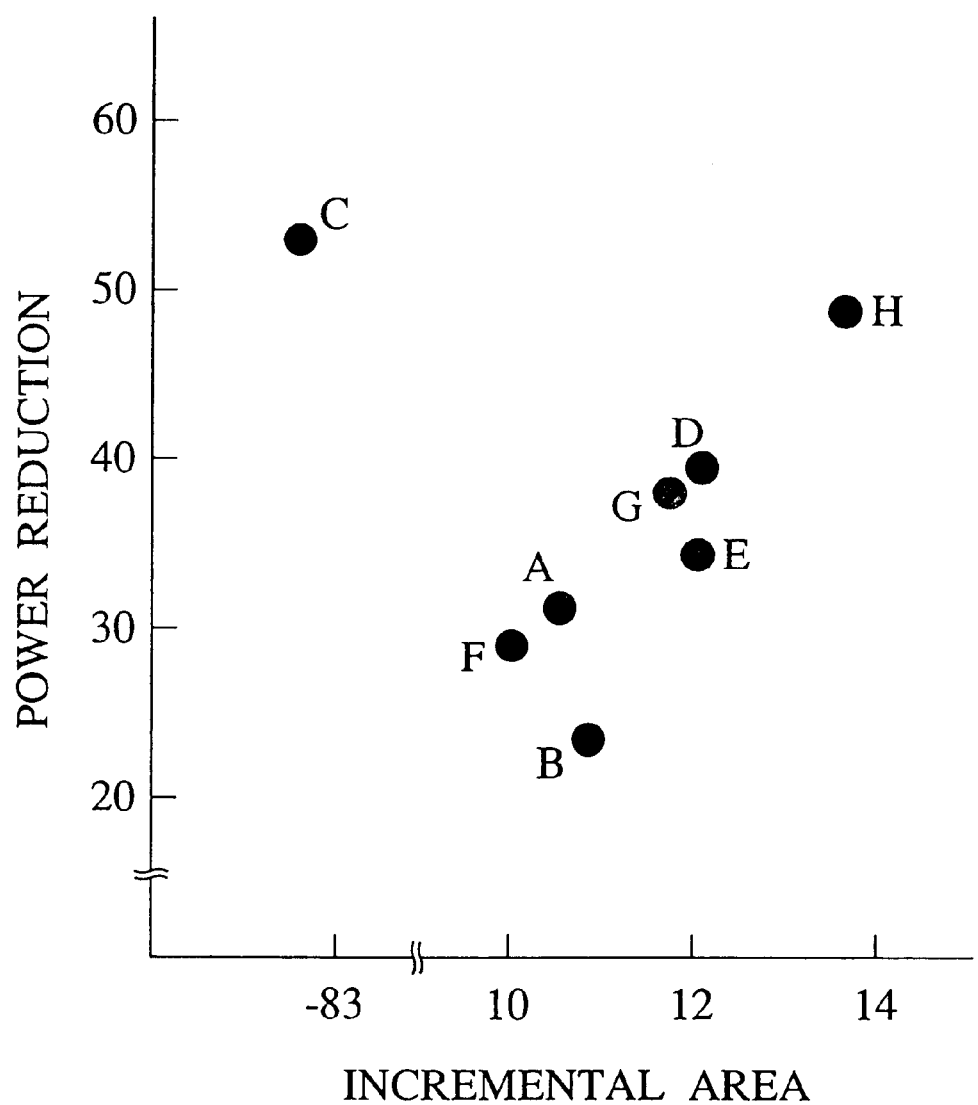
FIG. 20 is an exemplary graphical diagram showing information stored in the enable signal candidate information storing section.

In this embodiment of the present invention, information of the second embodiment as illustrated in FIG. 18 is stored in the enable signal candidate information storing section 6. Namely, a graph as illustrated in FIG. 20 is displayed in the CRT 19 with an ordinate indicative of the electric power consumption reduction and an abscissa indicative of the area as increased by introduction of the respective one of the eight enable signal candidates. The user can select an enable signal by pointing one of the enable signal candidates on the graph. Alternatively, the user can select an enable signal by pointing one of the enable signal candidates on the table as illustrated in FIG. 18 as displayed in the CRT 19.

In this case, the enable signal selection section 8 selects the enable signal candidate as pointed out, and then a clock gating circuit is generated by the clock gating circuit addition section 9 with the signal as pointed out to function as an actual enable signal.

As detailedly explained in the above, in accordance with the present invention, it is avoided to conduct gated clock design procedures with eventually inappropriate enable signals and therefore it becomes possible to make use of appropriate enable signals suitable for effectively saving the electric power consumption. By this configuration, it is possible to effectively reduce the electric power consumption by the appropriate gated clock design methodology.

Figure 21:
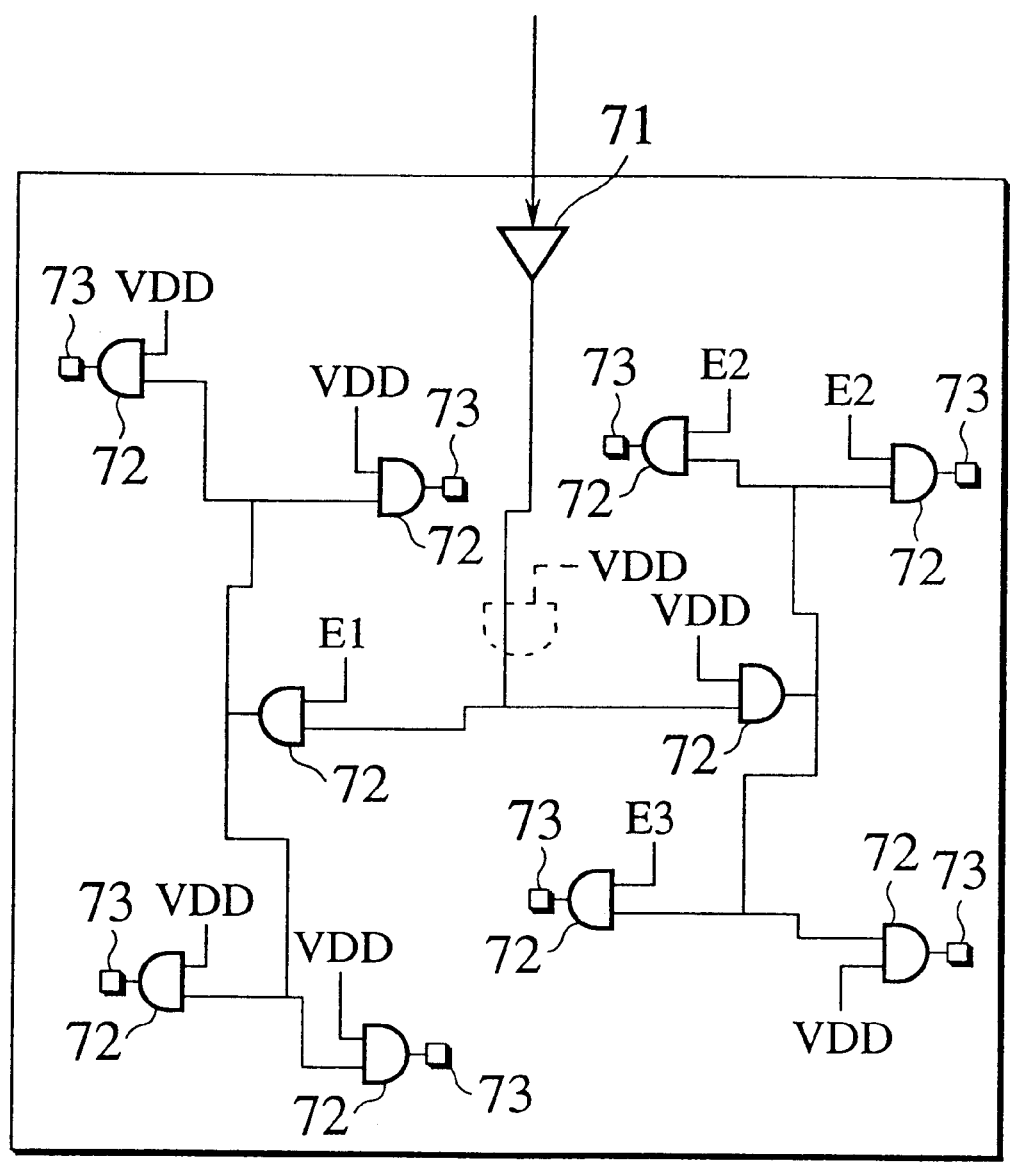
FIG. 21 is a circuit diagram showing the clock supplying circuit designed in accordance with the present invention.

In the followings, a fourth embodiment of the present invention will be explained with reference to the accompanying drawings. FIG. 21 is a circuit diagram showing the clock supplying circuit designed in accordance with the present invention. The root driver cell 71 is located in the position upstream of the clock signal supplying tree structure in order to amplify input the clock signal CLK and output the amplified signal to the two enable buffer cell 72 for outputting the logic product of the clock signal CLK and the enable signals E1 and the logic product of the clock signal CLK and the fixed signal VDD, which is corresponding to the logic one, "1", e.g., the power potential. A plurality of the enable buffer cells 72 are connected to these two enable buffer cells 72 connected to the root driver cell 71. Each enable buffer cell 72 for outputting the logic product of the input signals receives either one of the enable signals E1, E2 and E3 through said one terminal thereof and, when the enable signal is logic one, amplifies the clock signal as input and outputs its amplified clock signal to the next cell. On the other hand, there are other enable buffer cells 72 receiving the fixed signal VDD, i.e, "1" and therefore always output the clock signal after amplification to the next cell. Namely, these enable buffer cells 72 are always conducting (or transmitting) so as to function as a transfer buffer.

The output terminal of each enable buffer cells 72 serving as leaves of the clock supplying circuit tree structure is connected to a register (flip-flop) 3 located at the respective end for supplying the clock signal.

Next, the procedure of designing the clock supplying circuit tree structure as described above will be explained. The easiest way for designing a multi-stage buffering tree structure is the use of the enable buffer cells 72 each of which receives the enable signals E1 at the respective end of the multi-stage buffering tree structure in order that each enable buffer cell 72 is directly driven by the root driver cell 71, as illustrated in FIG. 22.

By designing the multi-stage buffering tree structure in such a manner, similar buffers can be located in the same depth of the tree structure, and therefore the delay times of the signals arriving the respective the register 73 can be even to minimize the clock skew.

Figure 22:
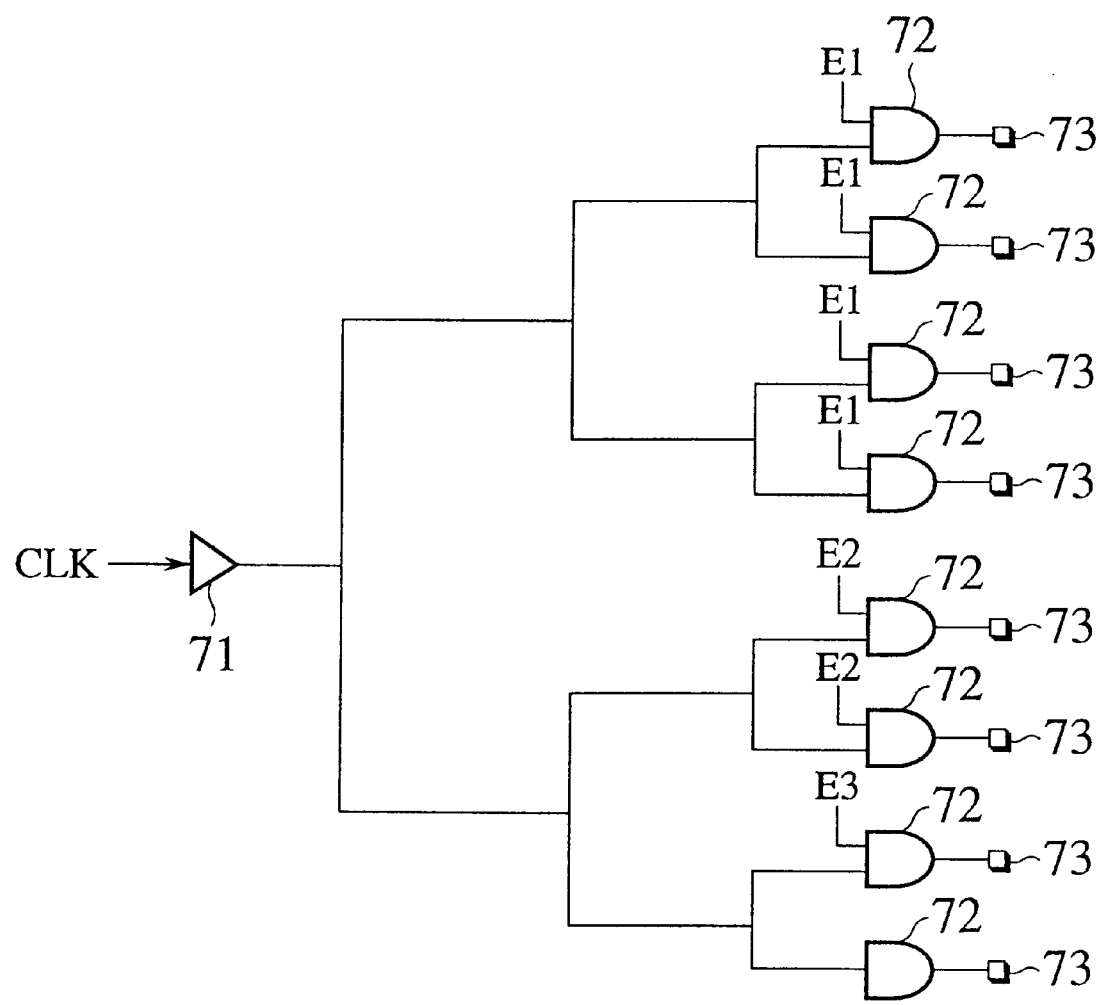
FIG. 22 is a circuit diagram for explaining how to apply the present invention to a clocked logic circuit as a first step.
Figure 23:
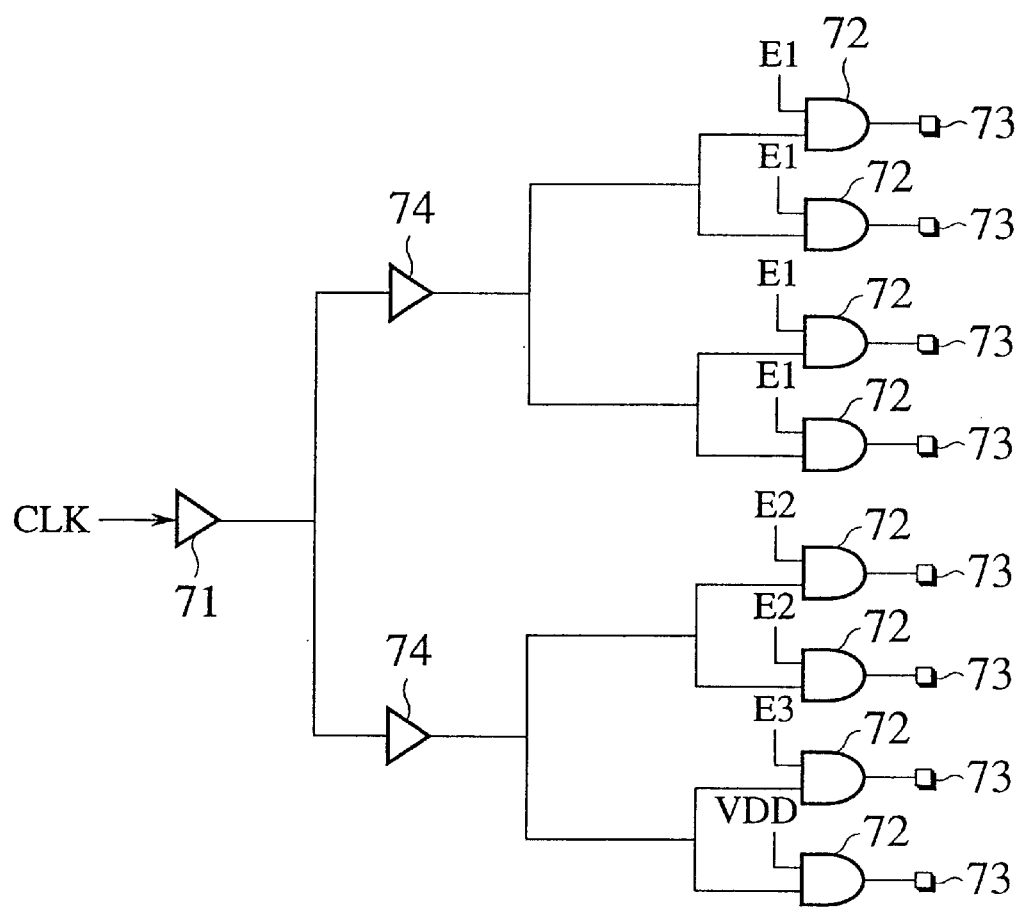
FIG. 23 is a circuit diagram for explaining how to apply the present invention to a clocked logic circuit as a second step.

When the driving power of the root driver cell 71 as illustrated in FIG. 22 is not sufficient, buffer cells 74 can be inserted between the root driver cell 71 and the enable buffer cell 72, as illustrated in FIG. 23. Also in this case, similar buffers can be located in the same depth of the tree structure, and therefore the delay times of the signals arriving the respective the register 73 can be even to minimize the clock skew. In this case, each buffer cell 74 is a simply buffer functioning only as an amplifier to transfer a clock signal to the next stage.

However, from the view point of saving the electric power consumption, it is appropriate that the enable buffer cells 72 actually controlled by the enable signals are located in the upstream side of the structure in order to prevent the subsequent buffer cells from being unnecessarily charged/discharged to save electric power and driving power otherwise consumed by the subsequent buffer cells. Also, by such a configuration, the number of the enable buffer cells 72 receiving the same enable signal can be decreased as well as the line lengths of the enable signals, and therefore the delay times of the enable signals can be decreased.

Contrary to this, in the case of the multi-stage buffering tree structure as illustrated in FIGS. 22 and 23, the registers 73 are directly driven by the enable buffer cells 72 located at the ends of the structure resulting in a substantial electric power consumption and a prolonged line length of the path for transmitting the enable signals, so that the delay time of the enable signals undesirably increase.

In order to remove these shortcomings encountered by the multi-stage buffering tree structure as illustrated in FIG. 23, it is required at the outset to easily make even the delay times while the same buffer cells as constituent elements of the tree are used in the respective stage of the tree in the same manner, for example, by making use of enable buffer cells receiving a fixed signal at one end in place of the buffer cell 74. For this purpose, the enable buffer cells 72 with enable terminals are inserted in respective stage of the tree. When an enable buffer cells 72 have to be simple transfer buffers, the enable terminal thereof is connected to the source of the fixed signal VDD.

Namely, a plurality of buffer cells are inserted between the root driver cell 71 and the register 73 to which the clock signal should be finally supplied in order to form the multi-stage buffering tree structure while the inserted buffer cells are provided with the enable terminals respectively.

Next, appropriate conditions and advantages will be discussed in advance which should be satisfied by the multi-stage buffering tree structure in order to remove the shortcomings encountered by the multi-stage buffering tree structure as illustrated in FIG. 23, (1) The same buffer circuit design is used for providing the buffer cells receiving enable signals and the buffer cells simply functioning as transfer buffers in order to make even the delay times and to minimize the clock skew.

(2) The number of the buffer cells receiving enable signals are decreased in order to minimize the length of the line transferring the enable signals as well as the delay times of the enable signals while the electric power consumption is effectively suppressed.

In addition to this, in accordance with the above (1), the flexibility of inserting buffer cells is enhanced in designing the multi-stage buffering tree structure so that the designing system becomes user friendly as a CAD system.

On the other hand, when designing the multi-stage buffering tree structure satisfying the requirement (2), the following requirements also have to be satisfied. Namely, in order to minimize the number of the enable buffer cell 72, (a) the enable signal is not given to the enable buffer cells 72 located in the downstream side of the enable buffer cell 72 to which the enable signal has been already given, in other words, a fixed signal is given to such enable buffer cells; and (b) On the other hand, when one of the enable buffer cells 72 is given an enable signal, there is no enable buffer cell between the root driver cell 71 and said one of the enable buffer cells 72, or otherwise, only buffer cells 72 receiving fixed signals are inserted therebetween.

Furthermore, in order to minimize the electric power consumption, (c) there are at least one enable buffer cell 72A driven by the enable signals Ea and at least one enable buffer cell 72B driven by the enable signals Eb which is different from the enable signals Ea and may be a fixed value signal, as seen from a driving cell P which supplies the clock signal directly to the enable buffer cell 72A and the enable buffer cell 72B.

In the above requirements, the requirements (a) and (b) are given for appropriate clock gating. On the other hand, the requirement (c) is given for avoiding the undesirable situation that one driving cell supplies the clock signal only to a plurality of the enable buffer cells all of which are commonly driven by the same enable signal. In other words, the requirement (c) is given for preventing for ineffective supplying enable signals.

Figure 24:
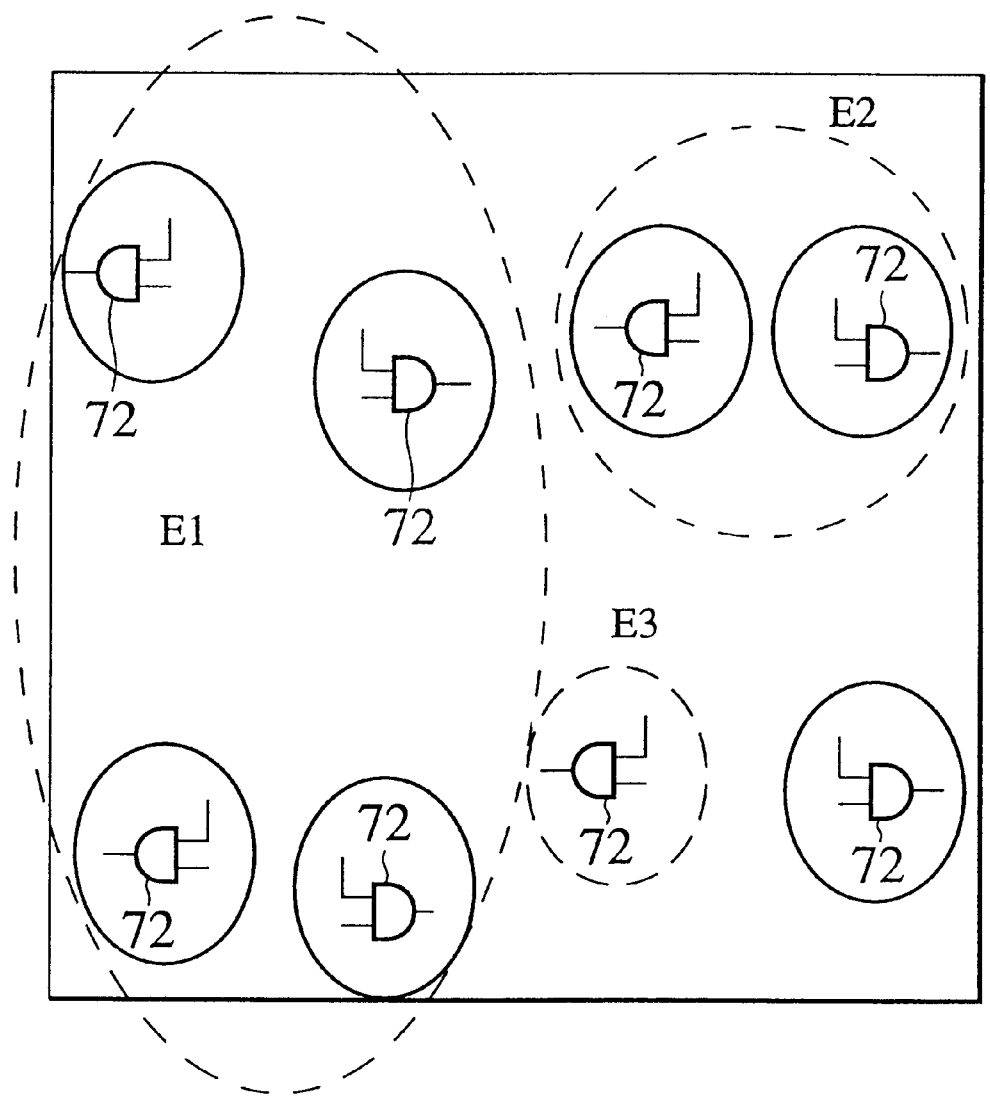
FIG. 24 is a circuit diagram for explaining how to divide the registers as illustrated in FIG. 22 into a plurality of the subgroups.

Next, the practical procedure will be explained for designing the clock supplying circuit tree structure satisfying the requirements as described above. First, a plurality of the subgroups are defined from the tree structure as illustrated in FIG. 23 in order that all the registers belonging to the same subgroup are driven with the clock signal under control of a common enable signal, as illustrated in FIG. 24. This classification is conducted in order to minimize differences between sums of the capacitance of the respective enable buffer cells at the connected terminals and the line capacitances within the network of each of the subgroups, i.e, in order to minimize the clock skew. For each of the enable signals E1, E2 and E3, the classification is repeated. An enable buffer cell 72 is then inserted for each of the subgroups in order to drive the registers 73 belonging to the subgroups by the corresponding one of the enable signals.

Figure 25:
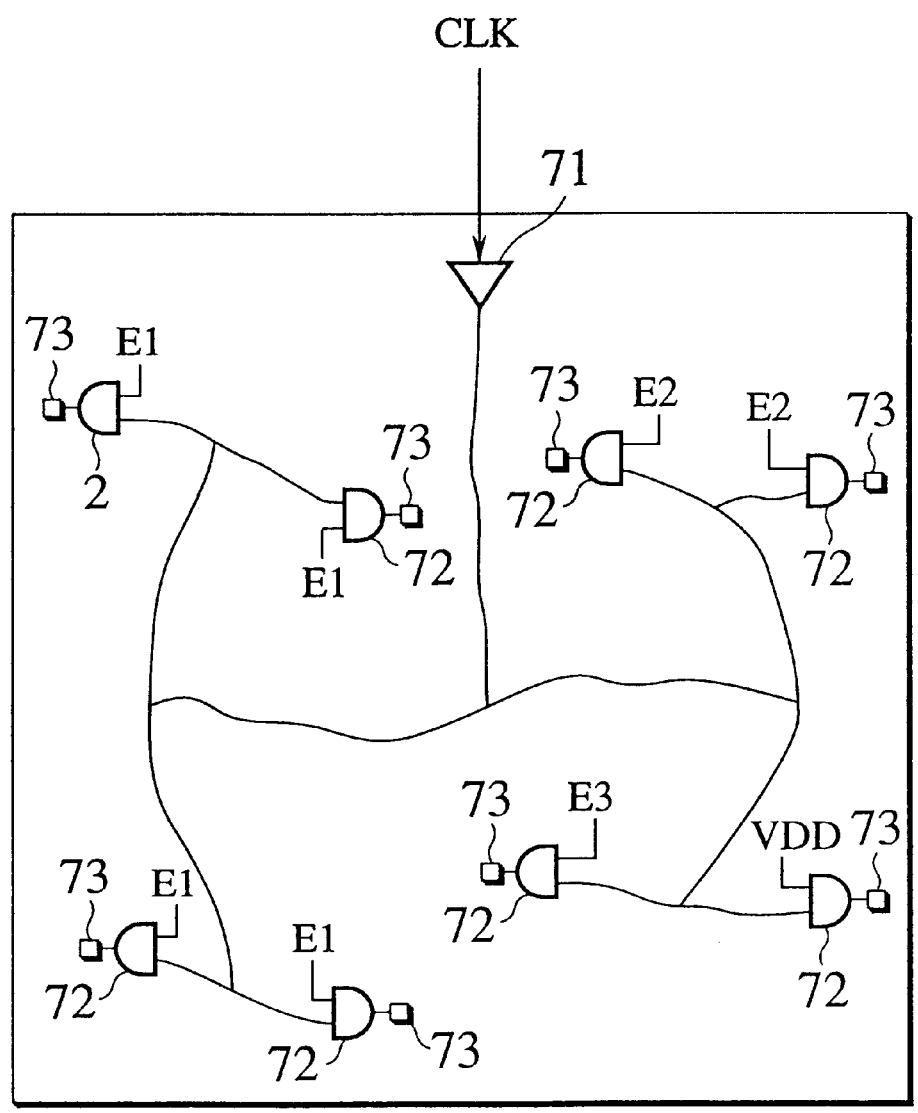
FIG. 25 is a circuit diagram for explaining how to apply the present invention to a clocked logic circuit as a third step.

Next, the multi-stage buffering tree structure is constructed with the root node of the root driver cell 71 and the leaf nodes of the enable buffer cells 72 as illustrated in FIG. 25, taking into consideration the classification. In this case, the edges and the branches of the tree are configured in order to minimize the length of the paths connecting one to another of the buffer cells driven by the same enable signal. More specifically speaking, the buffer cells under the same enable signals are associated with each other in the tree structure prior to other buffer cells.

Figure 26:
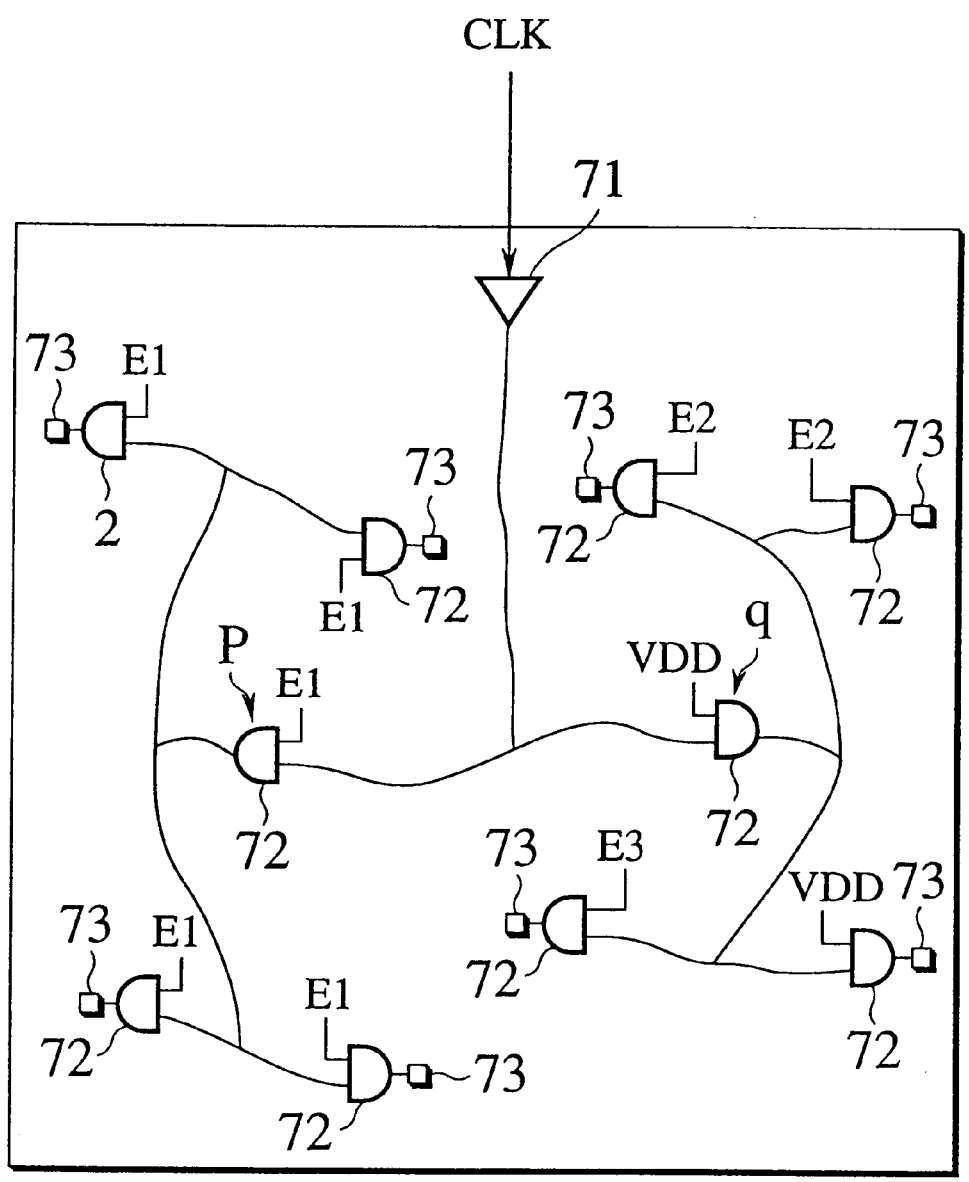
FIG. 26 is a circuit diagram for explaining how to apply the present invention to a clocked logic circuit as a fourth step.

When the load capacitance to be driven by the root driver cell 71 is too heavy, a number of the enable buffer cells 72 for transferring the clock signal as designated by references p and q are inserted as illustrated in FIG. 26.

Finally, the multi-stage buffering tree structure is vertically scanned from the root driver cell 71 to the downstream side thereof. During the scanning, when one of the enable buffer cells 72 as scanned in the intermediate position is driven by an enable signal and followed by subsequent buffer cells 72 which are also driven by the same enable signal, said one of the enable buffer cells is given the same enable signal and all the subsequent buffer cells are given a fixed signal such as logic one (or zero) at the enable terminals thereof. As a result, the multi-stage buffering tree structure as illustrated in FIG. 21 is constructed from the configuration as illustrated in FIG. 26.

Meanwhile, when the power of the root driver cell 71 is insufficient, one or more enable buffer cell 72 given the fixed signal VDD as illustrated with broken line is inserted. In this case, there are several implementations for making the enable buffer cell 72 to be a simply transferring buffer cell by giving a fixed signal such as logic one (or zero) at its enable terminal thereof. One of them is to provide a connection network for supplying the power potential ("1") or the ground potential ("0"). The transferring buffer cell is given the fixed signal through the common network. Alternatively, the enable buffer cell 72 is designed, in advance, with an auxiliary terminal fixed to the power potential or the ground potential. The enable terminals of the respective buffer cells are tied to the auxiliary terminals within the cells if necessary. The area of the buffer cells of the former case is smaller than that of the later case. However, the line length of the fixed signal line can be shortened in the later case. Accordingly, selection should be made taking into the penalty in the area.

In accordance with this embodiment of the present invention as illustrated in FIG. 21, the delay times are made uniform with respect to the respective lines to minimize the clock skew since the same buffer cell design is commonly used for providing the buffer cells receiving enable signals and the buffer cells simply functioning as transfer buffers, to which no enable signal is given. In addition, a fixed signal is given to the enable buffer cells 72 located in the downstream side of an upstream enable buffer cell 72 to which the enable signal has been already given. On the other hand, when one of the enable buffer cells 72 is given an enable signal, only buffer cells 72 receiving fixed signals are inserted, if any, between the root driver cell 71 and said one of the enable buffer cells 72. Furthermore, all the buffer cells as driven by the root driver cell 71 are such buffer cells receiving either the enable signals E1 or the fixed signal VDD, wherein one driving cell is connected to supply the clock signal to at least one enable buffer cell driven by a first enable signal and at least one enable buffer cell driven by a second enable signal which is different from the first enable signal and may be a fixed value signal. The electric power consumption can be thereby minimized with a smaller number of the enable buffer cells 72. Also, the length of the wirings for transferring the enable signals can be decreased to minimize the delay times of the enable signals since the number of the enable buffer cells receiving the enable signals is minimized.

Accordingly, in the clock gating circuit designing procedure, it becomes possible to improve the flexibility of determining locations of the buffer cells 72 for receiving the enable signals in the multi-stage buffering tree structure and to minimize the delay time and the skew of the clock signal while the procedure can be simplified. This technique can be implemented in a CAD system by means of which the clock supplying circuit in accordance with the gated clock technique can be designed in a shorter development time. Furthermore, as described above, the length of the wirings for transferring the enable signals can be minimized so that it is easily accomplished to satisfy the timing constraint upon the enable signals.

On the other hand, while there are two types of enable buffer cells for outputting the logic product of two input signals and for outputting the logic sum of two input signals, it is generally convenient from the view point of the LSI system design methodology that the two types have similar characteristics in terms of the signal delay. However, it is not easy to make even the characteristics of signal delay of the two types in the case of conventional configurations composed of the NAND gates and the NOR gates connected to high power inverters in series. This is because a p-type MOS transistor has an ON resistance per unit of the gate width is different than that of the n-type MOS transistor, and different consideration should be given to parallel connection and the serial connection. Particularly, in the case of the NOR gate, it is difficult to minimize the differential signal delay time.

Figure 27:
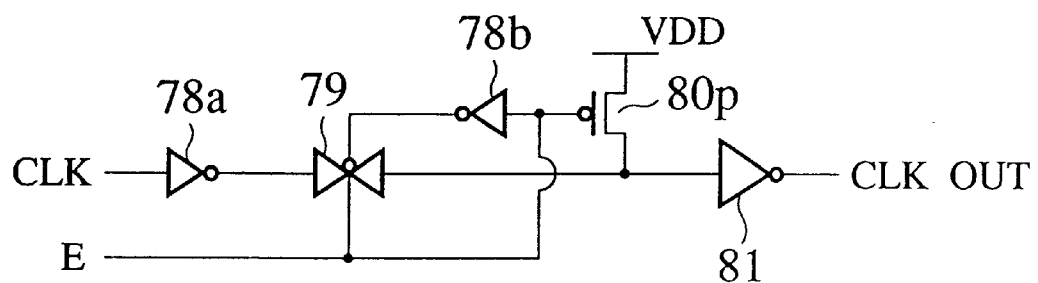
FIG. 27 is a circuit diagram showing an enable buffer cell in accordance with the present invention.

FIG. 27 is a circuit diagram showing an enable buffer cell in accordance with the present invention. An inverter 78, a transmission gate 79 and an inverter buffer 81 are connected to each other in series. The drain of the MOS transistor 80$p$ is connected to the input terminal of the inverter buffer 81 while the source of a P-channel type MOS transistor 80$p$ is pulled up to the VDD level. The gate of the MOS transistor 80$p$ is given an enable signal E, which is in turn given directly to the control terminal of the transmission gate 79 and, through the inverter 78$b$, to the inverted control terminal of the transmission gate 79.

Next, the operation of in this embodiment, of the present invention will be explained hereinbelow. The clock signal CLK is input through the inverter 78$a$ to the input terminal of the transmission gate 79 while the enable signals E is input to the control terminal of the transmission gate 79 and the gate of the MOS transistor 80$p$. At the same time, the enable signals E is inverted by the inverter 78$b$ and input to the inverted control terminal of the transmission gate 79. When the enable signals E is a logic one, the transmission gate 79 becomes conductive and the MOS transistor 80$p$ is turned off. The clock signal CLK is then output through the transmission gate 79 and the inverter buffer 81.

Contrary to this, when the enable signals E is a logic zero, the transmission gate 79 becomes closed and the MOS transistor 80$p$ is turned on. The input terminal of the inverter buffer 81 is given the fixed value signal VDD to output a logic zero. The clock signal CLK is therefore not transferred in this case.

In accordance with this embodiment of the present invention, an enable buffer cell for outputting the logic product of two input signals can be constructed by inserting a selector circuit composed of the transmission gate 79 and the p-type MOS transistor 80$p$ between two inverters connected in series. The series of inverters may be composed of three or more inverters.

Figure 28:
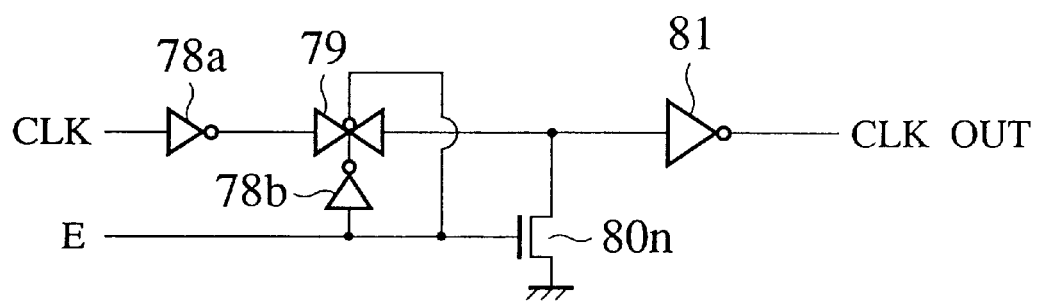
FIG. 28 is a circuit diagram showing another enable buffer cell in accordance with the present invention.

FIG. 28 is another circuit diagram showing an enable buffer cell in accordance with of the present invention. An inverter 78, a transmission gate 79 and an inverter buffer 81 are connected to each other in series. The drain of the MOS transistor 80$p$ is connected to the input terminal of the inverter buffer 81 while the drain of an N-channel type MOS transistor 80$n$ is connected to the ground level. The gate of the MOS transistor 80$n$ is given an enable signal E, which is in turn given directly to the control terminal of the transmission gate 79 and, through the inverter 78$b$, to the inverted control terminal of the transmission gate 79.

Next, the operation of in this embodiment of the present invention will be explained hereinbelow. The clock signal CLK is input through the inverter 78$a$ to the input terminal of the transmission gate 79 while the enable signals E is input to the control terminal of the transmission gate 79 and the gate of the MOS transistor 80$n$. At the same time, the enable signals E is inverted by the inverter 78$b$ and input to the inverted control terminal of the transmission gate 79. When the enable signals E is a logic zero, the transmission gate 79 becomes conductive and the MOS transistor 80$n$ is turned off. The clock signal CLK is then output through the transmission gate 79 and the inverter buffer 81.

Contrary to this, when the enable signals E is a logic one, the transmission gate 79 becomes closed and the MOS transistor 80$n$ is turned on. The input terminal of the inverter buffer 81 is given the ground level to output a logic one. The clock signal CLK is therefore not transferred also in this case.

In accordance with this embodiment of the present invention, an the enable buffer cell for outputting the logic sum of two input signals can be constructed by inserting a selector circuit composed of the transmission gate 79 and the n-type MOS transistor 80$n$ between two inverters connected in series. The series of inverters may be composed of three or more inverters also in this case.

It should be understood that the two enable buffer cells for outputting the logic product of two input signals and for outputting the logic sum of two input signals as illustrated in FIGS. 27 and 28 are substantially symmetrical arranged only with the opposite polarities of the MOS transistors 80 connected to the input terminal of the inverter buffer 81. By this configuration, the system designing procedure becomes easy to implement the clock supplying circuit in accordance with the first embodiment and as illustrated in FIG. 21 within an LSI.

Meanwhile, when the clock supplying circuit in accordance with the present invention is actually designed, it is often the case that the load capacitance upon the enable buffer cell becomes too heavy by a number of buffer cells generated to be driven with the same enable signal. For this reason, there may occur the problem that the requirement upon the arrival times at the respective clocked elements such as flip-flops can not be satisfied while the profile of a signal becomes dull. In such a case, the problem may possibly be solved by inserting the 1-input buffers for reinforcing the enable signals or replacing the circuit design of the enable buffer cells with a more powerful circuit design.

Figure 29:
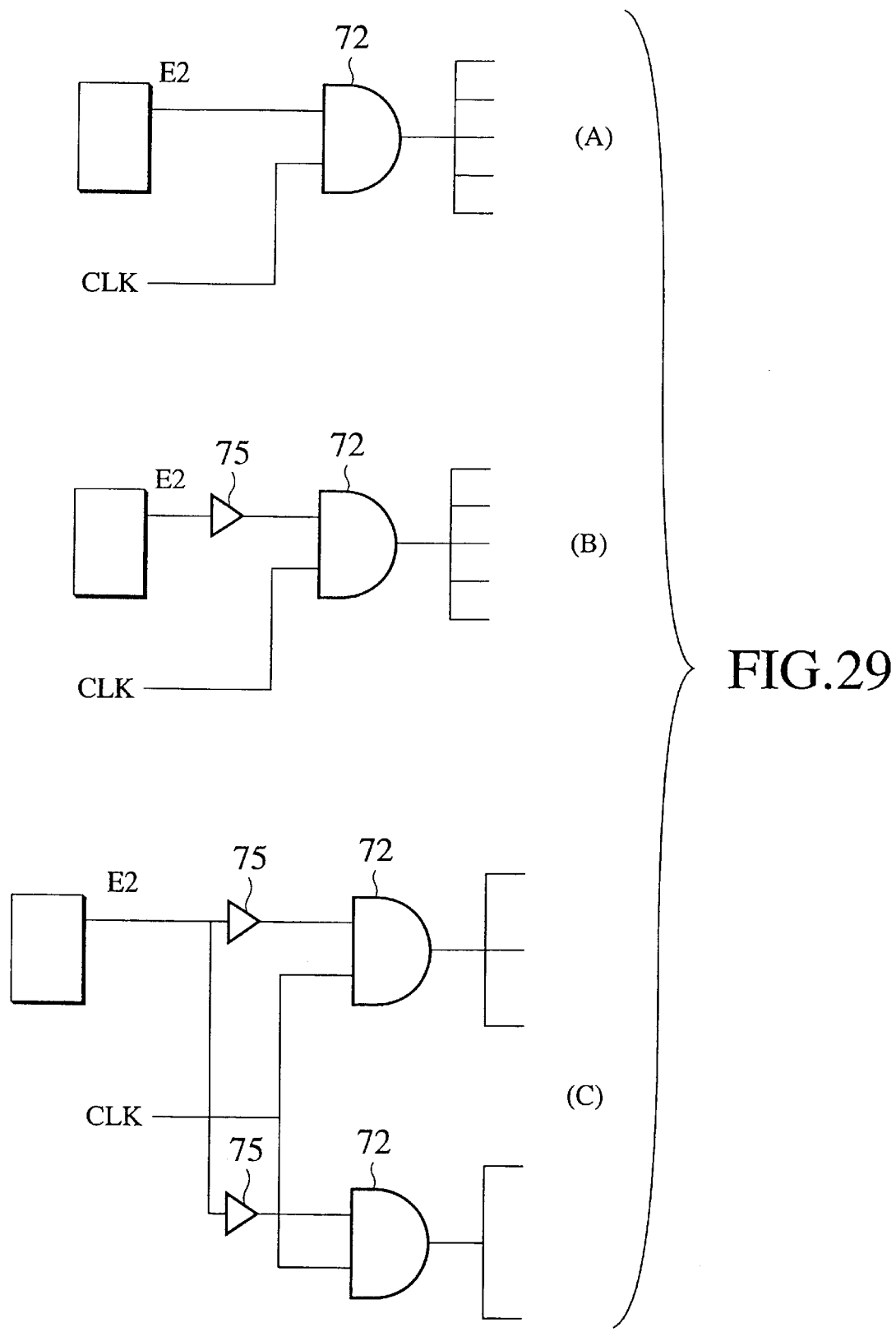
FIGS. 29(A) to 29(C) are circuit diagrams in which 1-input buffers for reinforcing the enable signals are inserted.

FIGS. 29(A) to 29(C) are circuit diagrams in which 1-input buffers for reinforcing the enable signals are inserted. For example, when the fan-out is too large as illustrated in FIG. 29(A), a 1-input buffer 75 for reinforcing the enable signal E2 is inserted in advance of the enable buffer cell 72, which is in turn replaced by a 2-input AND gate 72 designed to have a larger driving power, in order to solve the problem as discussed above. If the problem associated with the heavy load is not sufficiently eliminated by this modification, the enable signal E2 is branched into two 2-input AND gates 72 each of which is provided with a preceding 1-input buffer 75 for reinforcing the enable signal in order to reduce the fan-out.

However, such replacement or inserting often results in shortcomings that the replacement or inserting can not be implemented in appropriate locations from the view point of clock timing because the clock signal path and the location of the enable buffer cells are predetermined. The shortcoming originates from the order of the designing steps in which replacement or inserting is conducted after the clock signal path has been finally determined. Accordingly, it is possible to remove the shortcomings by conducting the steps of replacement or inserting before the clock signal path has been finally determined.

Figure 30:
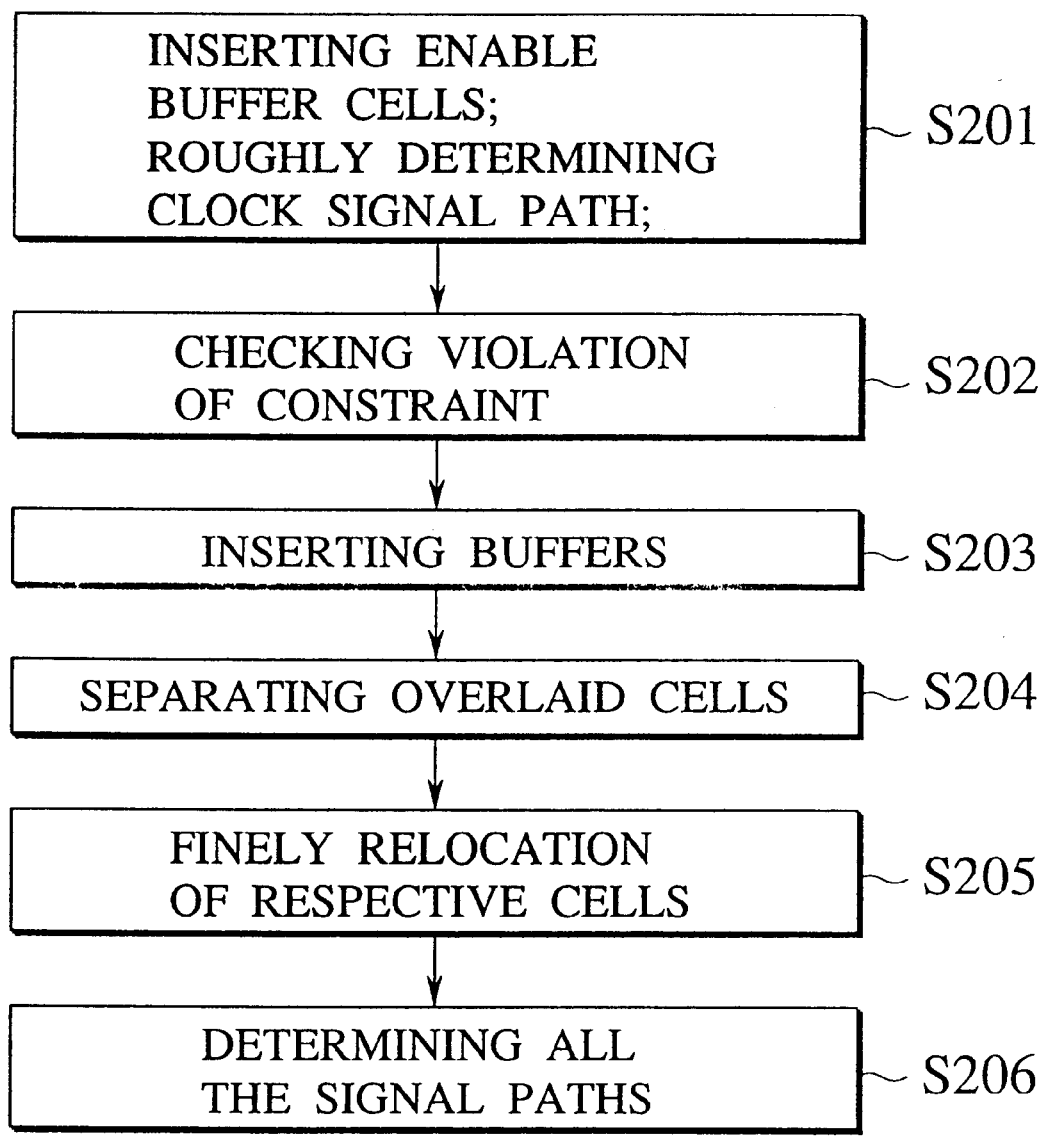
FIG. 30 is a flowchart showing a method of designing the clock supplying circuit in accordance with the present invention.

FIG. 30 is a flowchart showing a method of designing the clock supplying circuit in accordance with the present invention. In the step S201, the enable buffer cells are inserted in order to form a multi-stage buffering tree structure while the clock signal path is roughly determined. In the step S202, it is checked whether or not the load capacitance of each of the respective enable signals is within the driving capability of a driver cell outputting said each of the respective enable signals and whether or not there is an unsatisfied timing constraint upon the enable signals.

In the step S203, each unsatisfied timing constraint is resolved by inserting 1-input buffers for reinforcing the enable signals or replacing the circuit design of the buffers by a more powerful circuit design. In the step S204, overlaid cells are separated if any. In the step S205, the circuit design is configured by adjusting wirings of the clock signal paths in order to eliminate imbalance among delay times for respective clock signal paths in the multistage buffering tree structure. Finally, in the step S206, the other signal paths including the enable signals and other signals are determined.

Namely, optimization of the location of the enable buffer cells as inserted and the location of the 1-input buffers for reinforcing the enable signals are conducted at the same time, followed by determining the final layout of the clock signal paths. It therefore becomes easy to implement the process of minimization of the clock skew and optimization of enable signal transmission in the form of a computer-aided design, avoiding repetition of the layout process.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A computer aided design system for clock gated logic circuits comprising:

a circuit information storing section for storing information about a clock gated logic circuit under the design;

a halt condition determination section for determining, by the use of said information about the clock gated logic circuit, a halt condition under which a clocked circuit driven by a clock signal can halt with no clock signal supplied;

an enable signal candidate generation section for generating enable signal candidates, from said halt condition, which can be used as enable signals in the clock gated logic circuit;

an analysis section provided to analyze the clock gated logic circuit in order to obtain information about a delay time of signal transmission and electric power consumption reduction if respective one of enable signal candidate is used as an enable signal of a clock gating circuit inserted in the clock gated logic circuit under the design;

an enable signal candidate information storing section provided to store enable signal candidate information including the result of the analysis conducted by said analysis section;

a design restriction input section provided to input delay time limitations upon a delay time of signal transmission of the clock gated logic circuit under the design;

an enable signal selection section provided to select an appropriate one of the enable signal candidates which satisfy the delay time limitations, by the use of said enable signal candidate information and said delay time limitations information; and a clock gating circuit addition section provided to add a clock gating circuit activated with the enable signal as selected by said enable signal selection section to the clock gated logic circuit under the design.

2. The computer aided design system for clock gated logic circuits as claimed in claim 1 wherein said clocked circuit is a storage element to which data is loaded in synchronism with the clock signal while said halt condition determination section is a non-load condition determination section provided to determine the non-load condition under which it is not required to load data to said storage element.

3. The computer aided design system for clock gated logic circuits as claimed in claim 2, wherein said analysis section provided to analyze the clock gated logic circuit in order to obtain information also about an incremental area if respective one of enable signal candidates is used as an enable signal of the clock gating circuit in the clock gated logic circuit under the design.

4. The computer aided design system for clock gated logic circuits as claimed in claim 2 further comprising a non-load condition in put section provided to manually input non-load conditions under which it is not required to load data to said storage element.

5. The computer aided design system for clock gated logic circuits as claimed in claim 4 wherein the enable signal candidate information stored in said enable signal candidate information storing section is given in the form of a graph or a table on a CRT in order to make it possible to manually select an appropriate enable signal.

6. A computer aided design method for designing clock gated logic circuits comprising the steps of:

determining, by the use of information about a clock gated logic circuit under the design, a halt condition under which a clocked circuit driven by a clock signal can halt with no clock signal supplied;

generating enable signal candidates, from said halt condition, which can be used as enable signals in the clock gated logic circuit;

analyzing the clock gated logic circuit in order to obtain information about a delay time of signal transmission and electric power consumption reduction if respective one of enable signal candidates is used as an enable signal of a clock gating circuit inserted in the clock gated logic circuit under the design;

storing enable signal candidate information including the result of the analysis conducted by said analysis step in a information store means;

selecting an appropriate one of the enable signal candidates which satisfy given delay time limitations regarding a delay time of signal transmission in the clock gated logic circuit under the design, by the use of said enable signal candidate information; and adding the clock gating circuit activated with the enable signal as selected by said enable signal selection step to the clock gated logic circuit under the design.

7. The computer aided design method for clock gated logic circuits as claimed in claim 6, wherein the clocked circuit is a storage element to which data is input in synchronism with the clock signal and said halt condition is a non-load condition.

8. The computer aided design method for clock gated logic circuits as claimed in claim 6, further comprising a step of manually inputting a non-load condition under which it is not required to load data to said storage element.

9. The computer aided design and method for clock gated logic circuits as claimed in claim 6 wherein the enable signal candidate information stored in said enable signal candidate information storing step is given in the form of a graph or a table on a CRT in order to make it possible to manually select an appropriate enable signal.

10. A computer program embodied on a computer-readable medium for designing clock gated logic circuits, said program comprising:

means for determining, by the use of information about a clock gated logic circuit under the design, a halt condition under which a clocked circuit driven by a clock signal can halt with no clock signal supplied;

means for generating enable signal candidates, from said halt condition, which can be used as enable signals in the clock gated logic circuit;

means for analyzing the clock gated logic circuit in order to obtain information about a delay time of signal transmission and electric power consumption reduction if respective one of enable signal candidates is used as an enable signal of a clock gating circuit inserted in the clock gated logic circuit under the design;

means for storing enable signal candidate information including the result of the analysis conducted by said analysis step in a information store means;

means for selecting an appropriate one of the enable signal candidates which satisfy given delay time limitations regarding a delay time of signal transmission in the clock gated logic circuit under the design, by the use of said enable signal candidate information; and means for adding the clock gating circuit activated with the enable signal as selected by said enable signal selection means to the clock gated logic circuit under the design.

* * * * *